US012605955B2

(12) United States Patent
Weng et al.

(10) Patent No.: US 12,605,955 B2
(45) Date of Patent: Apr. 21, 2026

(54) PRINTER DRIVE MECHANISM

(71) Applicant: Hand Held Products, Inc., Charlotte, NC (US)

(72) Inventors: Lixiang Weng, Charlotte, NC (US); Longchao Zhao, Charlotte, NC (US); Lei Zheng, Charlotte, NC (US); Zhenjie Li, Charlotte, NC (US); Ximing Luo, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 46 days.

(21) Appl. No.: 18/417,449

(22) Filed: Jan. 19, 2024

(65) Prior Publication Data

US 2024/0262117 A1 Aug. 8, 2024

(30) Foreign Application Priority Data

Feb. 2, 2023 (CN) ......................... 202310093818.1

(51) Int. Cl.

| | |
|---|---|
| ***B41J 33/22*** | (2006.01) |
| ***B41J 2/325*** | (2006.01) |
| ***B41J 33/00*** | (2006.01) |
| ***B41J 35/28*** | (2006.01) |

(52) U.S. Cl.

CPC ............... *B41J 33/22* (2013.01); *B41J 2/325* (2013.01); *B41J 33/003* (2013.01); *B41J 35/28* (2013.01)

(58) Field of Classification Search

CPC . B41J 33/22; B41J 33/003; B41J 33/14; B41J 33/00; B41J 35/28; B41J 35/08; B41J 2/325; B41J 2/32

See application file for complete search history.

(56) References Cited

U.S. PATENT DOCUMENTS

| | | | |
|---|---|---|---|
| 5,333,959 | A | 8/1994 | Yamaguchi et al. |
| 5,820,279 | A | 10/1998 | Lodwig et al. |
| 5,927,875 | A | 7/1999 | Lau et al. |
| 7,467,902 | B2 | 12/2008 | Ono |
| 10,160,239 | B2 | 12/2018 | Chen et al. |

(Continued)

FOREIGN PATENT DOCUMENTS

| | | | |
|---|---|---|---|
| CN | 103507449 | B | 8/2016 |
| EP | 0551208 | A2 | 7/1993 |

(Continued)

OTHER PUBLICATIONS

Extended European Search Report Mailed on May 7, 2024 for EP Application No. 23220474, 9 page(s).

(Continued)

*Primary Examiner* — Kristal Feggins

(74) *Attorney, Agent, or Firm* — Alston & Bird LLP

(57) ABSTRACT

Methods, apparatuses, systems, computing devices, and/or the like are provided. An example method may include a printer assembly. An example printer assembly may include a printer ribbon drive mechanism. An example printer drive mechanism may include a drive wheel, a connector, a spring, and an actuator. An example actuator may be configured to translate from a first axial position to a second axial position. An example spring may be configured to apply a greater force when an actuator is disposed in the first axial position than when the actuator is disposed in the second axial position. The example method may also include a motor to apply a torque to a drive wheel.

20 Claims, 13 Drawing Sheets

(56) References Cited

U.S. PATENT DOCUMENTS

| | | | |
|---|---|---|---|
| 2012/0141184 | A1 | 6/2012 | Chen et al. |
| 2021/0070062 | A1 | 3/2021 | Kitahara |
| 2022/0153035 | A1 | 5/2022 | Sasaki et al. |

FOREIGN PATENT DOCUMENTS

| | | | |
|---|---|---|---|
| EP | 3792068 | A1 | 3/2021 |
| JP | 2006-334857 | A | 12/2006 |
| WO | 2014/000584 | A1 | 1/2014 |

OTHER PUBLICATIONS

Intention to grant Mailed on Oct. 21, 2025 for EP Application No. 23220474, 6 page(s).

Intention to grant Mailed on Mar. 5, 2026 for EP Application No. 23220474, 5 page(s).

PRINTER DRIVE MECHANISM

CROSS-REFERENCE TO RELATED APPLICATIONS

This application claims priority pursuant to 35 U.S.C. 119(a) to Chinese application Ser. No. 202310093818.1, filed Feb. 2, 2023, which application is incorporated herein by reference in its entirety.

TECHNICAL FIELD

The present disclosure relates to a drive mechanism capable of engaging with and dispensing a plurality of sizes of ribbons. Various devices and methods are also provided. In some example embodiments, the drive mechanism disclosed herein may be used to dispense ribbon media from a printing device.

BACKGROUND

Printers (e.g., desktop thermal printers) may fit a particular type or model of media (e.g., a printer ribbon). These ribbons may require different drive characteristics to use depending on their properties (e.g., size). As a result, multiple printers; rough, inaccurate drive characteristics; or other similarly unsuitable compromises must be made to allow printing with different sizes of media. For example, some printers may be configured to dispense only one size of ribbon requiring operator to have one or more additional printers and equipment for additional size ribbons. Through applied efforts, ingenuity, and innovation, Applicant has solved problems relating to ribbon drive mechanisms and related systems, assemblies, components, and methods by developing solutions embodied in the present disclosure, which are described in detail below.

BRIEF SUMMARY

Various embodiments of the present disclosure include drive wheel, assemblies, printing devices, and corresponding systems, devices, components, and methods related to ribbon drive mechanisms.

Various embodiments of the present disclosure may include a printer ribbon drive mechanism. In some embodiments, the drive mechanism may comprise a drive wheel configured to receive a torque from a motor and rotate about an axis of rotation. In some embodiments, the drive mechanism may include a connector configured to rotationally drive a printer ribbon, where the connector may be configured to rotate about the axis of rotation. In some embodiments, the drive mechanism may include a spring configured to compress along the axis of rotations. In some embodiments, the drive mechanism may include an actuator configured to move between a first axial position and a second axial position along the axis of rotation. In some embodiments, the actuator may be configured to define a first compression distance of the spring in the first axial position. In some embodiments, the actuator may be configured to define a second compression distance of the spring in the second axial position. In some embodiments, the spring may be configured to control a normal force applied directly or indirectly between the connector and the drive wheel along the axis of rotation. In some embodiments, the normal force may be greater in an instance in which the actuator is disposed in the first axial position than in an instance in which the actuator is disposed in the second axial position.

In some embodiments, the actuator may comprise at least one slot. In some embodiments, the connector may comprise at least one protrusion. In some embodiments, the at least one protrusion may be configured to be disposed in the at least one slot in a plurality of locations to define the first axial position and the second axial position.

In some embodiments, the actuator may comprise a button head. In some embodiments, the spring may be disposed between the button head of the actuator and a surface of the drive wheel. In some embodiments, the spring may be configured to directly or indirectly apply opposing forces therebetween.

In some embodiments, the actuator may be configured to rotate between a first rotational position and a second rotational position about the axis of rotation relative to the connector.

In some embodiments, the actuator may be configured to be disposed in the first rotational position in an instance in which the actuator is in the first axial position and in the second rotational position in an instance in which the actuator is in the second axial position.

In some embodiments, the connector may be configured to rotate relative to a printer chassis while moving between the first rotational position and the second rotational position. In some embodiments, the connector may be configured to remain rotationally fixed relative to the printer chassis while the actuator moves between the first rotational position and the second rotational position.

In some embodiments, the connector may be configured to rotate relative to a printer chassis while the actuator transitions between the first rotational position and the second rotational position. In some embodiments, the actuator may be configured to remain rotationally fixed relative to the printer chassis while the actuator transitions between the first rotational position and the second rotational position.

In some embodiments, the drive mechanism may be configured to engage a larger ribbon in an instance in which the actuator is disposed in the first axial position than in an instance in which the actuator is disposed in the second axial position.

In some embodiments, the drive mechanism may be configured to apply a larger torque to the ribbon in which the actuator is disposed in the first axial position than in an instance in which the actuator is disposed in the second axial position.

In some embodiments, the speed from the motor may remain constant between the first axial position and the second axial position of the actuator. In some embodiments, the normal force and a drive torque may be imparted directly or indirectly to the connector by the drive wheel varies between the first axial position of the actuator and the second axial position of the actuator.

In some embodiments, the connector may comprise a connector body and at least one wear resistant sheet configured to engage the drive wheel.

Various embodiments of the present disclosure may include a printer assembly. In some embodiments, the printer assembly may include a motor. In some embodiments, the printer assembly may include a printer ribbon. In some embodiments, the printer assembly may include a printer chassis. In some embodiments, the printer assembly may include a printer drive mechanism. In some embodiments, the drive mechanism may comprise a drive wheel configured to receive a torque from a motor and rotate about an axis of rotation. In some embodiments, the drive mechanism may include a connector configured to rotationally drive a printer ribbon, where the connector may be configured to rotate about the axis of rotation. In some embodiments, the drive mechanism may include a spring configured to compress along the axis of rotations. In some embodiments, the drive mechanism may include an actuator configured to move between a first axial position and a second axial position along the axis of rotation. In some embodiments, the actuator may be configured to define a first compression distance of the spring in the first axial position. In some embodiments, the actuator may be configured to define a second compression distance of the spring in the second axial position. In some embodiments, the spring may be configured to control a normal force applied directly or indirectly between the connector and the drive wheel along the axis of rotation. In some embodiments, the normal force may be greater in an instance in which the actuator is disposed in the first axial position than in an instance in which the actuator is disposed in the second axial position.

In some embodiments, the actuator may further comprise at least one slot. In some embodiments, the connector may comprise at least one protrusion. In some embodiments, the at least one protrusion may be configured to be disposed in the at least one slot in a plurality of locations to define the first axial position and the second axial position.

In some embodiments, the actuator may be configured to rotate between a first rotational position and a second rotational position about the axis of rotation relative to the connector.

In some embodiment, the actuator may be configured to be disposed in the first rotational position in an instance in which the actuator may be in the first axial position and in the second rotational position in an instance in which the actuator may be in the second axial position.

In some embodiments, the drive mechanism may be configured to apply a larger to torque to the ribbon in an instance in which the actuator may be disposed in the first axial position than in an instance in which the actuator may be disposed in the second axial position.

In some embodiments, the speed from the motor may remain constant between the first axial position and the second axial position of the actuator. In some embodiments, the normal force and a drive torque may be imparted directly or indirectly to the connector by the drive wheel varies between the first axial position of the actuator and the second axial position of the actuator.

In some embodiments the connector may comprise a connector body and at least one wear resistant sheet configured to engage the drive wheel.

Various embodiments of the present disclosure may include a method of driving a printer ribbon with a printer assembly. In some embodiments, the printer assembly may include a motor. In some embodiments, the printer assembly may include a printer ribbon. In some embodiments, the printer assembly may include a printer chassis. In some embodiments, the printer assembly may include a printer drive mechanism. In some embodiments, the drive mechanism may comprise a drive wheel configured to receive a torque from a motor and rotate about an axis of rotation. In some embodiments, the drive mechanism may include a connector configured to rotationally drive a printer ribbon, where the connector may be configured to rotate about the axis of rotation. In some embodiments, the drive mechanism may include a spring configured to compress along the axis of rotations. In some embodiments, the drive mechanism may include an actuator configured to move between a first axial position and a second axial position along the axis of rotation. In some embodiments, the actuator may be configured to define a first compression distance of the spring in the first axial position. In some embodiments, the actuator may be configured to define a second compression distance of the spring in the second axial position. In some embodiments, the spring may be configured to control a normal force applied directly or indirectly between the connector and the drive wheel along the axis of rotation. In some embodiments, the normal force may be greater in an instance in which the actuator is disposed in the first axial position than in an instance in which the actuator is disposed in the second axial position. In some embodiments, the method may include operating the motor to apply the torque to the drive wheel, such that the drive wheel may be configured to, directly or indirectly, cause the printer ribbon to rotate.

In some embodiments, the actuator may be configured to actuate from the first axial position to the second axial position. In some embodiments, replacing the printer ribbon with a second printer ribbon having a second diameter less than a first diameter of the printer ribbon.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

The following drawings are illustrations of a particular embodiment of the present disclosure and thereof do not limit the scope of the present disclosure. The drawings are not necessarily drawn to scale and are intended for use in conjunction with the explanation in the following detailed description.

DETAILED DESCRIPTION

Figure 1A:
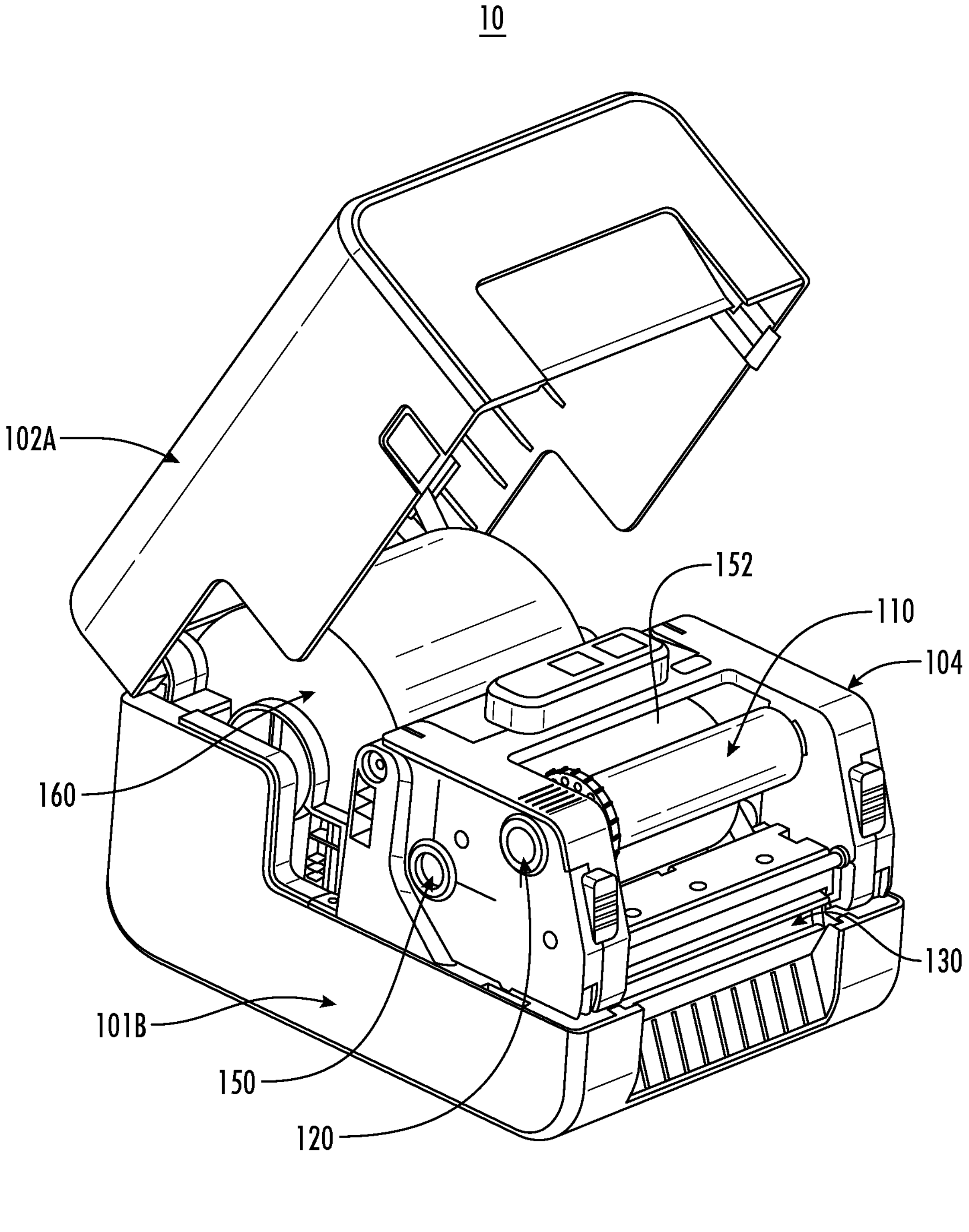
FIG. 1A illustrates a perspective view of a printer assembly in accordance with various embodiments of the present disclosure.

Some embodiments of the present disclosure will be described in a more detailed manner hereinafter with reference to the accompanying drawings, in which some, embodiments of the invention are shown. Reference numbers refer to elements throughout the drawings. Multiple embodiments of the current invention may be embodied in different forms and should not be limited to the embodiments set forth herein. Rather, these embodiments are provided so that this disclosure will satisfy applicable legal requirements.

As used herein, terms such as "front," "rear," "top," etc. are used for explanatory purposes in the examples provided below to describe the relative positions of certain components or portions of components relative to other components or portions of components. As used herein, the term "or" is used in both the alternative and conjunctive sense, unless otherwise indicated. The term "along," and similarly utilized terms, means near or on, but necessarily requiring directly on an edge or other referenced location. The terms "approximately," "generally," and "substantially" refer to within manufacturing and/or engineering design tolerance for the corresponding materials and/or elements unless otherwise indicated. The use of such term is inclusive of and is intended to allow independent claiming of specific values listed. Thus, use of any such aforementioned terms, or similarly interchangeable terms, should not be taken to limit the spirit and scope of embodiments of the present invention. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment. As used herein, the terms "example," "exemplary," and the like are used to "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

The figures are provided to illustrate some examples of the invention described. The figures are not to limit the scope of the present embodiment of the invention or the appended claims. Aspects of the example embodiments are described below with reference to example applications for illustration. It should be understood that specific details, relationships, and methods are set forth to provide a full understanding of the example embodiments. One of ordinary skill in the art recognize the example embodiment can be practice without one or more specific details and/or with other methods.

The present disclosure relates to drive mechanism for a printer assembly capable of dispensing a plurality of sizes of ribbons (e.g., ribbon cores having different core diameters, such as 0.5 inch and 1 inch core openings) to allow for versatile operation and reducing the number of assemblies and/or printers needed to accommodate multiple sizes (e.g., 0.5 inch and 1 inch printer ribbons). As used herein, the terms "ribbon" and "printer ribbon" refer to an assembly including the ribbon media (e.g., ribbon film) and at least one or more components that support the ribbon media (e.g., one or more ribbon supports, such as cores, spindles, spools, and the like) to be driven by the drive mechanism discussed herein. As used herein, the term "ribbon support" refers to one or more components that support the ribbon media and engage one or more portions of a drive mechanism as discussed herein, including but not limited to ribbon cores (e.g., cardboard support tubes), spindles, and the like. As used herein, the "size" of the ribbon refers to the inner diameter of the ribbon film media and/or the core (e.g., a cardboard tube) supporting the media without requiring consideration of separately-attached spindles or other detachable mechanisms. For example, in some embodiments, a ribbon size may be a diameter measured to the innermost piece of ribbon media and/or the inner or outermost ribbon core surface. Various devices and methods are also provided. In some example embodiments, the drive mechanism disclosed herein may be used to dispense ribbon media from a printer assembly. In various embodiments, the printer drive mechanism may be a friction drive mechanism. The friction drive mechanism may be actuatable to vary the torque output from the mechanism onto a printer ribbon. The torque may be varied without exchanging parts or undertaking other inefficient reconfigurations. Typical drive mechanisms typically support only a single size of ribbon and/or a single source of ribbon (e.g., a single shape made by a single manufacturer), requiring users to have an additional printer assembly for different size ribbons. The torque required to drive different ribbons may vary, such that a printer is difficult to convert between ribbon types and sizes. The present disclosure solves these problems and others via the actuatable drive mechanism and assemblies disclosed herein.

In some instances, various printer assemblies use different types of ribbon (e.g., thermal transfer ribbons, etc.). The printer assemblies according to the various embodiments of the present disclosure may be any printer assembly that uses ribbon. The printer assemblies according to the various embodiments of the present disclosure may be able to dispense a plurality of different sizes of ribbons using embodiments of the drive mechanism discussed herein. For example, the printer assembly may be configured to hold and dispense a one-inch ribbon in a first configuration, and the printer assembly may be configured to hold and dispense a half-inch ribbon in a second configuration. The printer assembly may be actuatable between configurations to vary the torque output to the respective ribbons. For example, the connector may be configured to apply a larger amount of torque to a larger size ribbon than a smaller size ribbon. In various embodiments, the different size ribbons may be configured to engage, directly or indirectly, with a connector of the drive mechanism, either directly or indirectly, and the connector may include one or more individual components. The connector may be configured to frictionally engage a drive wheel, directly or indirectly, apply the torque received from the friction of the drive wheel to the ribbon.

Embodiments of the present disclosure provide a printer drive mechanism capable of applying proper amount of torque to dispense a plurality of different sizes of ribbons to allow for a more versatile, efficient operation. Various embodiments of the present disclosure may additionally or alternatively allow easier printing of various sizes of ribbon by allowing the user to easily swap the size of ribbon and adjust the outputted torque applied to the ribbon. While some embodiments discussed herein include drive mechanism and printer assemblies, these examples should be understood to not limit the overall scope of the disclosure, and the printer drive mechanism disclosed herein may be used to dispensing any material from any dispensing assembly.

Embodiments of the present disclosure may allow for printing with multiple size ribbons using a single printer assembly, in some instances, without adjusting a motor output. Said differently, in some embodiments, the printer assembly may comprise a printer drive mechanism capable of applying different amounts of torque to different sizes of ribbon using the same motor input. In some embodiments, the printer drive mechanism may include a drive wheel, a connector, a spring, and an actuator, with the connector being configured to engage with the actuator, directly or indirectly. In some instances, the connector may be configured to at least partially rotate relative to the actuator and/or at least partially translate relative to the actuator to facilitate adjustment of the torque. In some embodiments, the connector may be configured to assist the actuator in translating from a first axial position to a second axial position adjusting the amount of torque applied to a ribbon.

In some embodiments, the ribbon (e.g., via a ribbon support) and the connector may rotationally abut and engage each other such that the connector directly drives the ribbon. For example, in some embodiments, the connector may engage and drive the ribbon without relying solely on friction, such as with one or more protrusions and/or recesses configured to extend into slots on the ribbon (e.g., a core of the ribbon, such as a cardboard tube supporting the ribbon media) or engage a spindle supporting the ribbon core (e.g., slots, tabs, or the like formed in a spindle supporting the core of the ribbon). In some embodiments, the connector may be configured to receive the torque from a drive wheel, either directly or indirectly, via friction as part of the friction drive mechanism. In various embodiments, the term "friction drive mechanism" and the like may refer to the printer drive mechanism using friction between at least two surfaces of the mechanism (e.g., two planar, abutting surfaces) to transfer torque via friction therebetween, without requiring or precluding the use of non-friction-based drive portions in other areas of the printer drive mechanism. In some embodiments, the friction drive mechanism may use a spring to impart forces (e.g., normal force) between a drive wheel connected to a motor of the printer assembly and a connector, directly or indirectly. The friction between two or more contacting surfaces (e.g., planar surfaces abutting each other) in the friction drive mechanism may be based in part on the normal force and may cause the torque to transfer from the drive wheel to the connector to dispense the ribbon media of the ribbon. In various embodiments, the spring compressed to a first axial position may be configured to apply a greater imparting force, directly or indirectly, between the drive wheel and connector than the spring compressed to a second axial position. As a result, the greater friction force resulting from the spring compressed to the first axial position may cause the torque applied to the ribbon to be greater in an instance in which the spring is compressed to the first axial position than when the spring is compressed to the second axial position.

In some embodiments, the printer drive mechanism may be configured to use an actuator to vary the torque output of the friction drive by adjusting the normal force between contacting surfaces of the drive wheel and connector assemblies. In this manner, the component(s) connected to the motor side of the friction drive may be considered the upstream component(s) of the friction drive mechanism and the component(s) connected to the ribbon side of the friction coupling may be considered the downstream component(s) of the friction drive mechanism. In some embodiments, the upstream components may terminate at a contacting surface (e.g., a surface of the drive wheel or a portion thereof), and in some embodiments, the downstream components may begin at a contacting surface (e.g., a surface of the connector or a portion thereof, such as a wear resistant sheet as discussed herein). In some embodiments, the actuator may comprise a slot and/or protrusion that interacts with a corresponding protrusion and/or slot on the downstream side of the drive mechanism (e.g., on the connector body). The slots and protrusions may be configured to hold the actuator in a plurality of axial positions to apply different compressions to the spring, thereby changing the spring force and thus the corresponding drive torque.

In various embodiments, the larger ribbons (e.g., one-inch ribbons) may require greater torque that smaller ribbons (e.g., half-inch ribbons), and the drive mechanism as described herein may allow a printer (e.g., a thermal transfer printer) to accommodate a plurality of ribbon sizes with the appropriate amount of torque being used for each ribbon. Non-limiting embodiments of printer drive mechanism and printer assemblies are described with reference to FIGS. 1A-9. The embodiment may be used with a plurality of different ribbon sizes and printer assemblies.

FIGS. 1A-9 depict views of example printer assemblies, drive mechanisms, (e.g., a printer assembly 10 and printing drive mechanism 200) and portions thereof in accordance with various embodiments of the present disclosure. FIG. 1A depicts an exemplary perspective view of a printer assembly 10, which in the depicted includes an outer shell 102A, 102B, a chassis 104, a ribbon 110, and a portion of a drive assembly 120. In various embodiments, the printer assembly outer shell may comprise a top outer shell portion 102A and a bottom outer shell portion 102B. The top outer shell portion 102A may be disposed above the bottom outer shell portion 102B. In various embodiments, the top outer shell portion 102A may be configured to rotate via one or more hinges, wherein the top outer shell portion 102A may be configured to rotate from a first position (e.g., closed position) to a second position (e.g., open position). The top outer shell portion 102A may be configured to engage with and/or secure with the bottom outer shell portion 102B creating an outer shell configured to house various internal components of the printer assembly 10, including, but not limited to, the ribbon 110, the drive assembly 120, and/or the chassis 104. In various embodiments, the printer assembly 10 may be configured to receive, dispense, and/or accommodate a plurality of different size ribbons via an adjustable torque mechanism as described herein. In operation, the printer assembly 10 may pass the ribbon media (e.g., film) of the ribbon across a print head 130 from a first ribbon support to a second ribbon support. A motor (e.g., the motor 140 shown in FIG. 1B) may drive the ribbon 110 via the drive mechanism discussed herein to pull the ribbon media off a supply ribbon core (e.g., the rear portion of ribbon media 152 connected to a rear axle mechanism 150 shown in FIG. 1A) and onto the ribbon support (e.g., the ribbon core 111) discussed herein (e.g., the front ribbon portion shown in FIG. 1A). In some embodiments, a motor (e.g., the same motor 140 shown in FIG. 1B) may be configured to rotate a print media spool 160 configured to synchronously dispense the print media and the ribbon media across the print head 130, with the friction drive discussed herein providing the appropriate torque for synchronizing the print media spool and ribbon media.

Figure 1B:
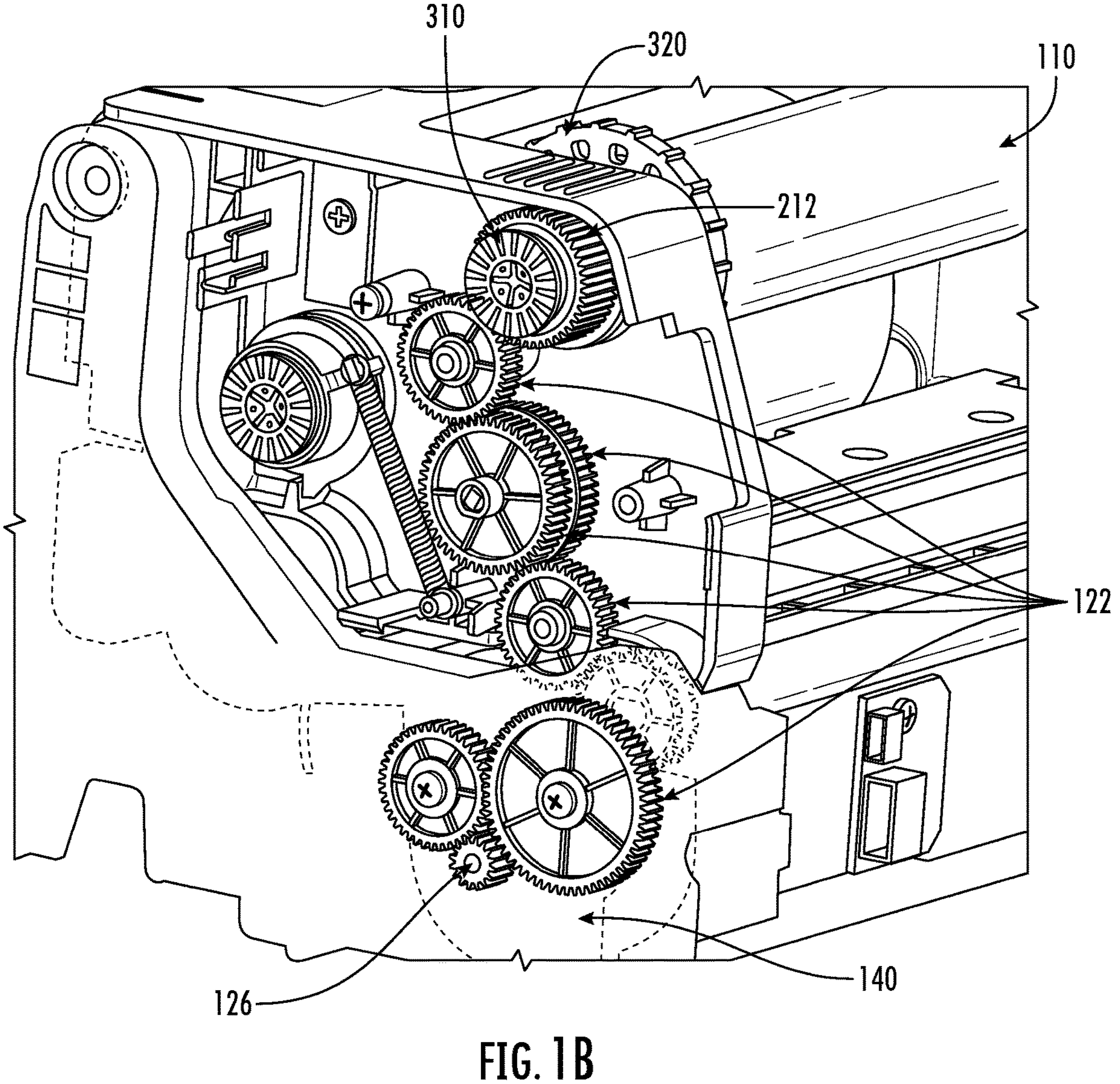
FIG. 1B illustrates a perspective view of a portion of a drive assembly within a printer assembly in accordance with various embodiments of the present disclosure.

With reference to FIG. 1B, an upstream portion of a drive assembly 120 of a printer assembly 10 is depicted in accordance with various embodiments of the present disclosure. In various embodiments, the drive assembly 120 may comprise a plurality of drive components, including but not limited to, a motor 140, a motor output shaft 126, a drive wheel 212, and/or one or more intermediate drive components 122 (e.g., various gears, belts, or the like). The drive components 122 may be configured to reduce the overall amount of torque outputted by the motor and applied to a drive wheel 212. In one or more embodiments, the motor 140 may be configured to output a constant speed (e.g., RPM) to the motor output shaft 126, such that, the motor output shaft 126 transmits the torque from the motor 140 to one or more intermediate drive components 122. The motor 140 may be configured to output a constant speed (e.g., 400 RPM) that dives the upstream components of the drive mechanism (e.g., upstream of the friction-torque transfer mechanism).

With continued reference to FIG. 1B, in various embodiments, intermediate drive components 122 may comprise a total gear ratio configured to change the outputted torque from the motor 140 to a desired amount of torque (e.g., 100 N*mm to 130 N*mm) at the drive wheel 212 to dispense a plurality of sizes of ribbons. At least one intermediate drive components 122 may be configured to engage, directly or indirectly, with the drive wheel 212 to assist with the dispensing of the ribbon 110. In various embodiments, at least one intermediate drive component 122 may be configured to engage with the motor output shaft 126. The at least one drive component 122 connected to the motor output shaft 126 may be connected to at least one additional drive component. The at least one drive component 122 may be configured to engage with a drive wheel 212. The one or more drive components engaged with the drive wheel 212 may configure the drive wheel 212 to output the torque to the connector 320.

Figure 2A:
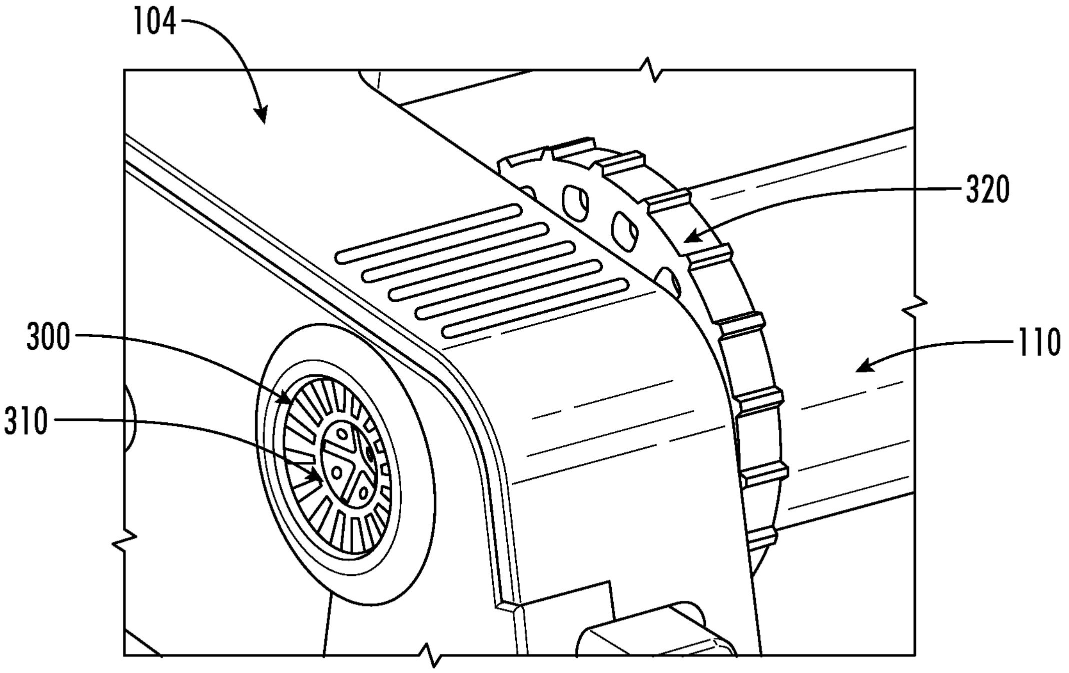
FIGS. 2A-2B illustrate partial perspective view of a printer assembly showing an actuator, a connector, and a ribbon in accordance with various embodiments of the present disclosure.
Figure 2B:
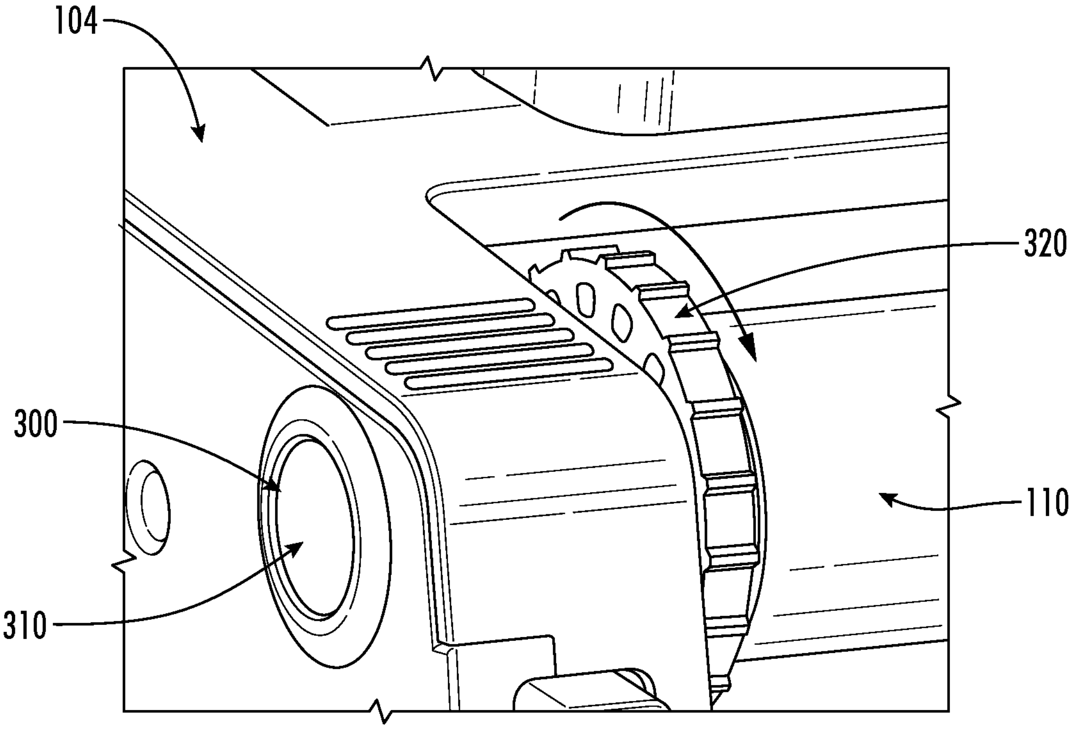

FIGS. 2A-2B illustrate partial perspective view of a printer assembly showing an actuator, a connector, and a ribbon in accordance with various embodiments of the present disclosure. In various embodiments, the torque driving the ribbon may be variable and actuatable by a user. In the depicted embodiments of FIGS. 2A-2B, an actuator may be used by an operator to adjust this torque by moving the actuator between two or more axial positions, which, as discussed further herein, controls a normal force caused by a spring that affects the friction output of the drive mechanism. The actuator may be used in several ways. For example, in various embodiments, as depicted in FIG. 2A, a first method for translating an actuator 300 from a first axial position to a second axial position may include rotating the actuator 300. For example, the connector 320 may remain stationary while the actuator 300 is translated and, in some embodiments, rotated independently from the connector 320. In the embodiment of FIG. 2A, rotation of the actuator 300 may lock and/or unlock the actuator from at least one of the first or second axial position. The actuator may be depressed to cause the translation in an instance in which the actuator is unlocked (e.g., permitted to travel axially relative to the connector). The user may rotate the actuator 300 either clockwise and/or counterclockwise as part of the locking/unlocking process to facilitate translating the actuator from the first axial position to the second axial position or vice versa. In the embodiment depicted in FIG. 2A, the actuator 300 may be rotated by a user, for example, by frictionally twisting the actuator with the user's finger or with another tool, such as a screwdriver, stuck into the slot(s) on the actuator's button head. In some embodiments, the connector 320 may rotate instead of or in addition to the actuator 300 to facilitate the locking and/or unlocking described herein. For example, in the embodiment depicted in FIG. 2B, a user may engage with the actuator 300 by depressing the actuator and rotating the connector 320 independently from actuator to facilitate the locking and/or unlocking. The connector 320 and/or the actuator 300 may be configured to rotate relative to the chassis 104 of the printer assembly. In some embodiments, the actuator 300 and the connector 320 may be configured to rotate about the same rotational axis, wherein the axis of rotation may extend axially along the actuator through the ribbon.

Figure 3A:
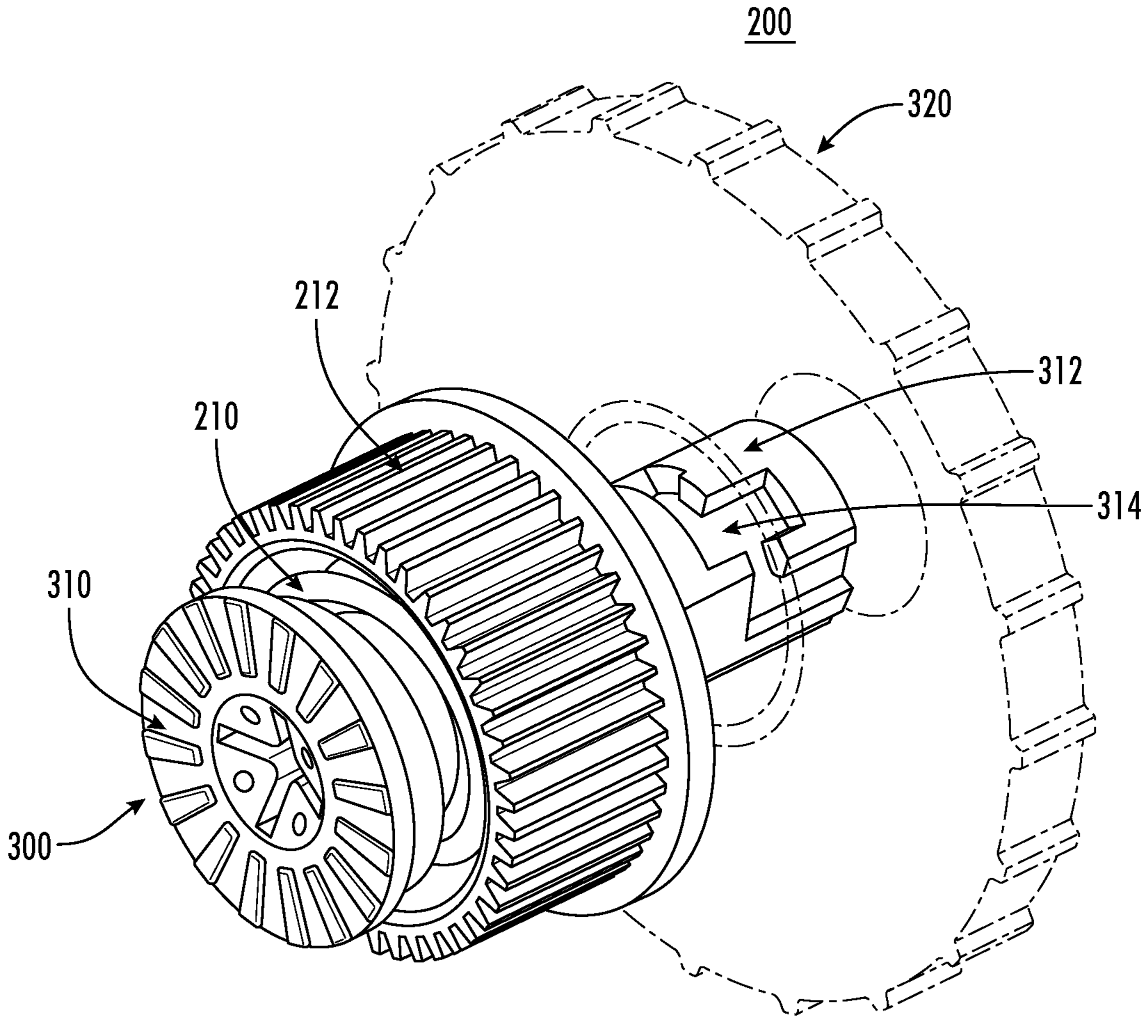
FIG. 3A illustrates a perspective view of an exemplary drive mechanism in accordance with various embodiments of the present disclosure.

With reference to FIGS. 3A-5, an example friction drive mechanism 200 of a printer assembly is shown in accordance with various embodiments of the present disclosure. In various embodiments, as depicted in FIG. 3A, an example portion of a friction drive mechanism 200 may comprise a spring 210 and a drive wheel 212. In the depicted embodiments, a body of the connector 320 is shown in a transparent manner so that the actuator 300 may be viewed therein. In one or more embodiments, the spring 210 and the drive wheel 212 may be configured to, at least in part, facilitate application of torque to the connector. The connector 320 may thereby be configured to rotate and dispense the ribbon media. In various embodiments, the drive wheel 212 may be configured to receive a predetermined amount of torque based at least in part on the axial location of the actuator from one or more driving components and use the friction drive mechanism 200 to transfer the torque to the connector and ribbon. The friction drive mechanism 200 may further utilize the spring 210 disposed between a bottom surface of the actuator head 310 and a surface of the drive wheel 212 (e.g., an innermost, outward-facing surface of the inside of the drive wheel in the depicted embodiment). The spring 210 may be configured to control the amount of normal force applied between the drive wheel 212 and the connector 320 (e.g., either the main body of the connector or one or more intermediate components making up the connector, which is downstream of the friction interface) based on the amount of compression of the spring 210. The spring 210 in greater compression may apply a greater amount of force to drive wheel 212 and thus applying a greater amount of friction between the upstream drive components and the downstream drive components.

With further reference to FIG. 3A, in various embodiments, the drive wheel may be a gear (or may otherwise include teeth), a belt, a pulley, and/or the like configured to translate the torque from one or more portions of the drive mechanism (e.g., via one or more paths from a motor, directly or indirectly) to the connector via friction drive. The spring 210 may be further configured to apply a force on both the drive wheel 212 and at least a portion of an actuator. In various embodiments, the spring 210 may be configured to be disposed beneath the lowermost surface of a button head 310 of the actuator 300 and a surface of the drive wheel 212. In various embodiments, the spring 210 may be configured to apply a force directly or indirectly to the drive wheel 212 in a first direction, and the same magnitude force directly or indirectly to the connector (e.g., via the actuator) in a second direction opposite the first. The force applied to the drive wheel 212 may define, at least in part, the amount of friction produced between the drive wheel and the connector, with a higher spring force corresponding to a higher friction, and thereby a higher torque.

Figure 3B:
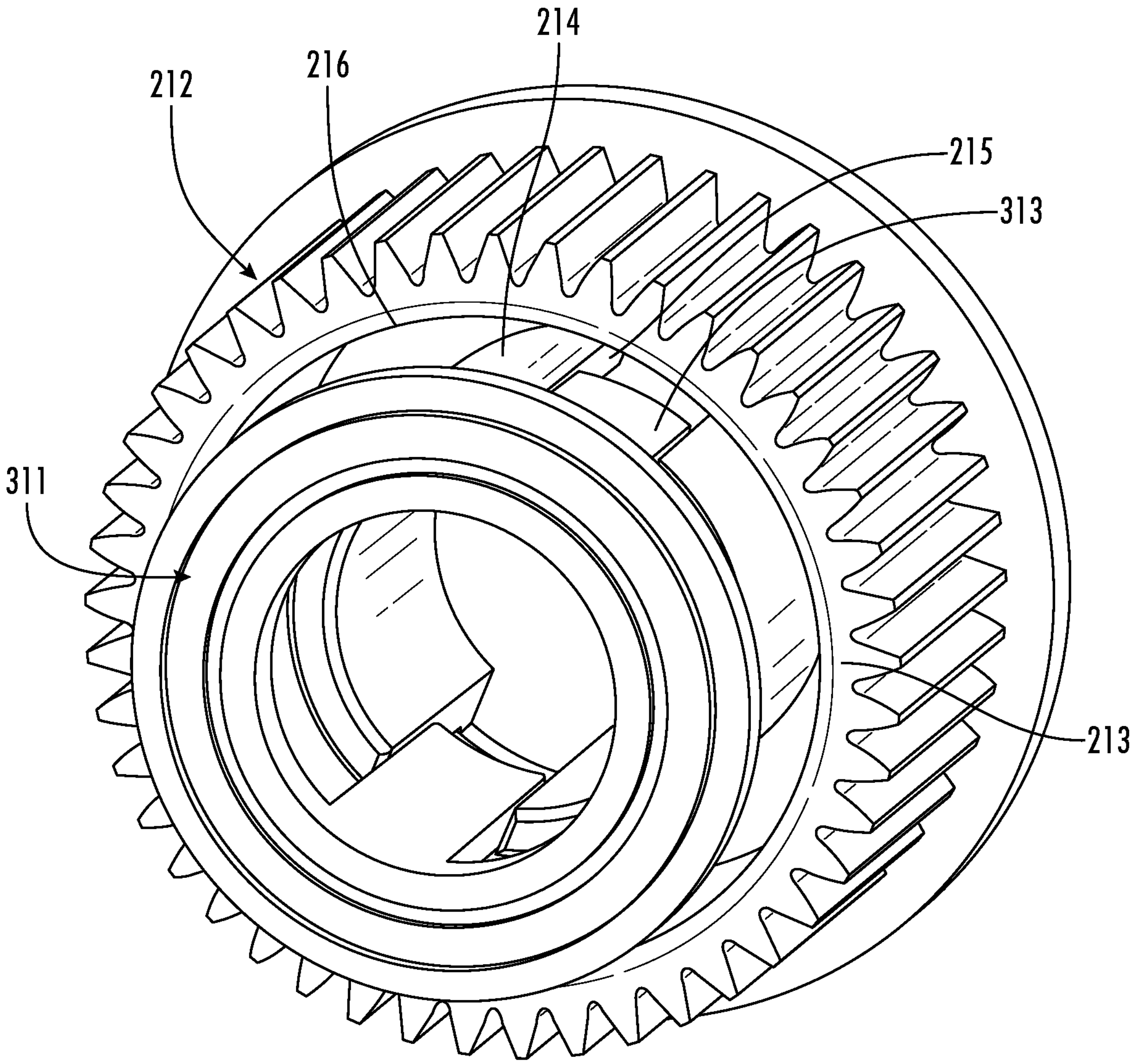
FIG. 3B illustrates an example drive wheel and wear resistant member in accordance with various embodiments of the present disclosure.

With reference to FIG. 3B, the drive wheel 212 may include an inner flange 214 and an outer gear portion 213. In the depicted embodiment, the inner flange 214 and outer gear portion are joined by an inner annular surface 216, and the drive wheel 212 is configured to at least partially house the spring 210 between the inner flange and outer gear portion.

Figure 4A:
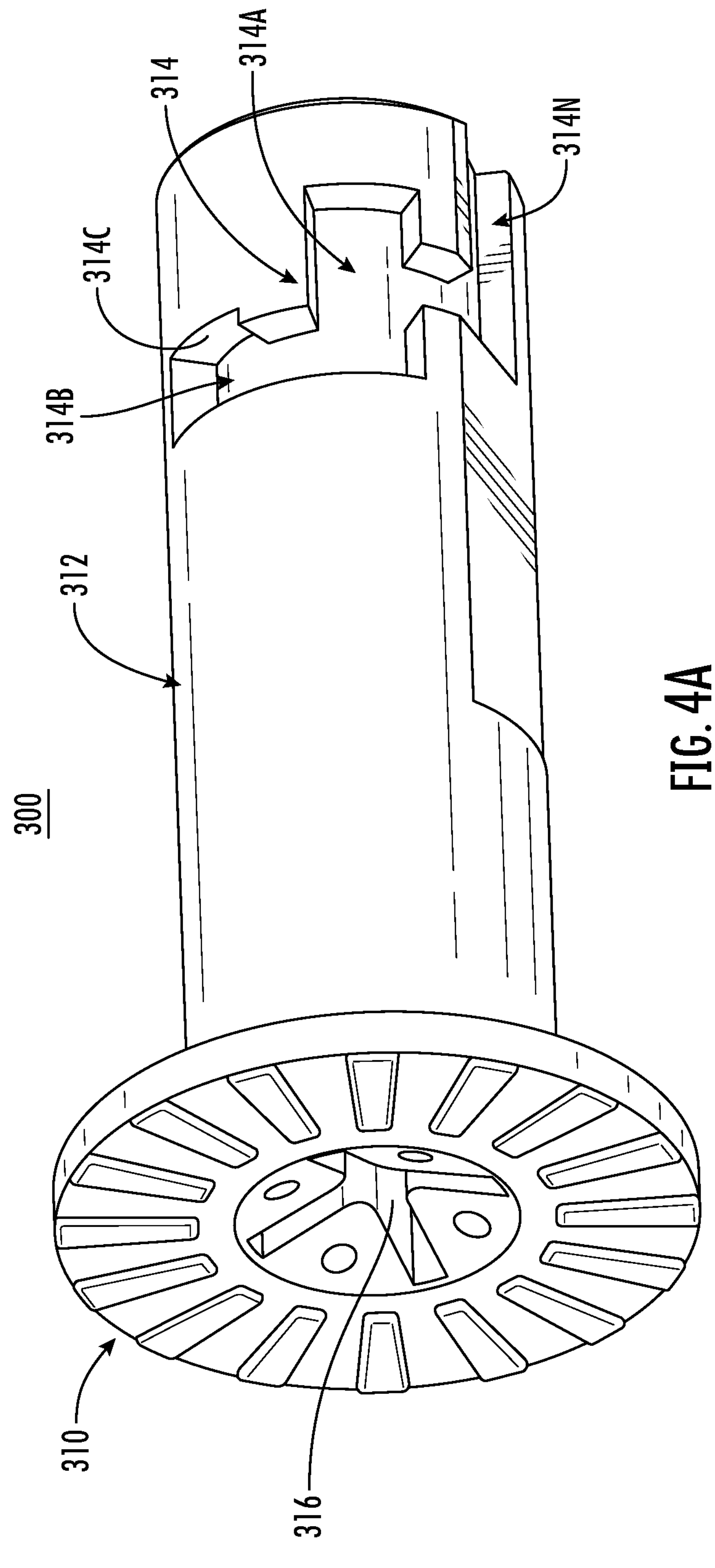
FIG. 4A illustrates a side perspective view of an exemplary actuator in accordance with various embodiments of the present disclosure.
Figure 4B:
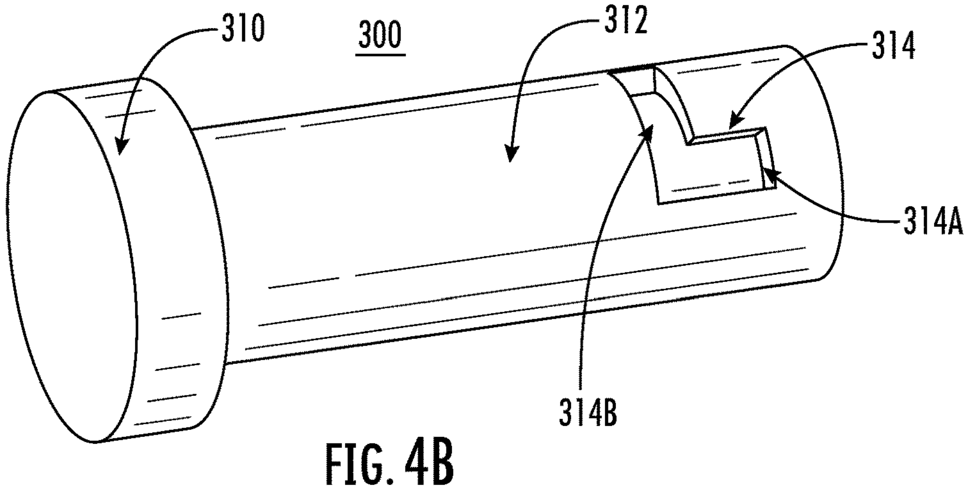
FIG. 4B illustrates a side perspective view of an exemplary actuator in accordance with various embodiments of the present disclosure.

With reference to FIGS. 4A-4B, exemplary perspective views of an actuator are depicted in accordance with various embodiments of the present disclosure. In various embodiments, an actuator 300 may be configured in a manner, such that, the actuator may be one continuous part. In some other embodiments, an actuator 300 may be configured in a manner, such that, the actuator 300 may be two or more parts (e.g., a button head portion 310 and/or a body portion 312). In various embodiments, an actuator 300 may comprise a button head portion 310 and/or a body portion 312. The button head portion 310 may comprise one or more slots 316, as depicted in FIG. 4A. The one or more slots 316 may be configured to assist in rotating the actuator 300 when the actuator is engaged by a user (e.g., via a screwdriver). In other embodiments, the button head portion may comprise a flat surface, as depicted in FIG. 4B. The flat surface may be configured to be depressed by a user without requiring (although not prohibiting) rotation of the button head portion 310.

With continue reference to FIGS. 4A-4B, in various embodiments, the actuator body portion 312 may comprise at least one slot portion and/or protrusion (e.g., a slot-protrusion connection may be formed between the actuator and the connector, and the respective locations of the protrusion and slot may be in either of the two). In various embodiments, the at least one slot portion 314 may comprise one or more portions configured to engage with a corresponding protrusion. In some embodiments, the at least one slot 314 may comprise a first slot portion 314A and a second slot portion 314B. In some embodiments, as depicted in FIG. 4A, the slot may comprise one or more additional slot portions 314N. In various embodiments, the first slot portion 314A may be configured to be disposed axially closer to the ribbon than the second slot portion 314B. The first slot portion 314A and second slot portion 314B may each be configured to engage with a protrusion of the connector at various portions of the travel distance of the connector within the slot 314. In the depicted embodiments, the first slot portion 314A is oriented parallel to the axis of rotation of the actuator 300 and the second slot portion 314B is oriented perpendicular to the axis of rotation of the actuator about the circumference of the actuator. The actuator 300 and/or connector 320 may be configured to move between the first axial position and the second axial position along the first slot portion 314A (e.g., axial motion may be accomplished along the first slot portion). The actuator 300 and/or connector 320 may be configured to rotate between a first rotational position and a second rotational position along the second slot portion 314B. The rotational movement may lock and/or unlock the actuator and connector from at least one of the first axial position and second axial position. For example, in the depicted embodiment, a distal end of the first slot portion 314A (e.g., a position farthest from the second slot portion 314B along the first slot portion) may be configured to define the second axial position of the actuator 300, which may correspond to a minimum spring force for the drive assembly (e.g., for a smallest ribbon size). In the depicted embodiment, the second slot portion 314B may be configured to define a second axial position of the actuator 300 along its length (e.g., the same or substantially the same axial position from end to end). In operation, the locking and/or unlocking of the protrusion may be facilitated by rotating the protrusion into and out of the second slot portion 314B. In some embodiments, the second slot portion 314B may extend in either circumferential direction from the first slot portion 314A (e.g., to facilitate clockwise or counter-clockwise unlocking). In the depicted embodiment, a distal end of the second slot portion 314B (e.g., a position farthest from the first slot portion 314A along the second slot portion) comprises a notched section 314C configured to provide additional locking of the protrusion. The one or more additional slot portions 314N may be configured to engage with a protrusion of a connector. The additional slot portions 314N in the depicted embodiment may be configured to allow the protrusion to be removed and the actuator and connector to be disconnected for disassembly.

With further reference to FIGS. 4A-4B, in various embodiments, the slot 314 may comprise an L-shape configuration, wherein the L-shape configuration may define an axial portion and a radial portion. In the depicted embodiment FIG. 4A, the first slot portion 314A may comprise a notched section 314C, such that it may be configured to rotationally engage/secure with a protrusion of a connector to prevent inadvertent unlocking (e.g., the actuator must be at least partially axially depressed to release the notched section. In some embodiments, the actuator may include a plurality of slots 314 (e.g., two or more) spaced circumferentially and/or axially around the actuator for engaging separate projections. In embodiments in which the actuator 300 comprises one or more projections, the various embodiments of slot described herein may be transposed onto a matching surface of the connector.

With reference to FIG. 4B, another example embodiment of the actuator 300 is shown. In various embodiments, the button heads 310 and/or other features of the actuators of FIGS. 4A-4B may be interchanged individually or in any combination. In the embodiment depicted in FIG. 4B, the one or more slots 314 of the actuator may be configured in a simple L-shape configuration without notched sections on the slot portions, which may operate in substantially the same manner as the slot of FIG. 4A without the corresponding notched section 314C and additional slot portions 314N. The first slot portion 314A may be configured to engage with a protrusion of a connector through rotational engaging. The first slot portion 314A securely engages with the protrusion via rotational force from the connector. The actuator 300 may be configured to translate from the first axial position defined by the first slot portion 314A to the second axial position defined by the second slot portion 314B via a user depressing the actuator 300 and rotation the actuator and/or rotating the connector clockwise and/or counterclockwise. In other embodiment, the actuator 300 may be translated by a user depressing the actuator and rotating the connector, wherein the corresponding protrusion of the connector may rotate to the second slot portion 314B.

Figure 5:
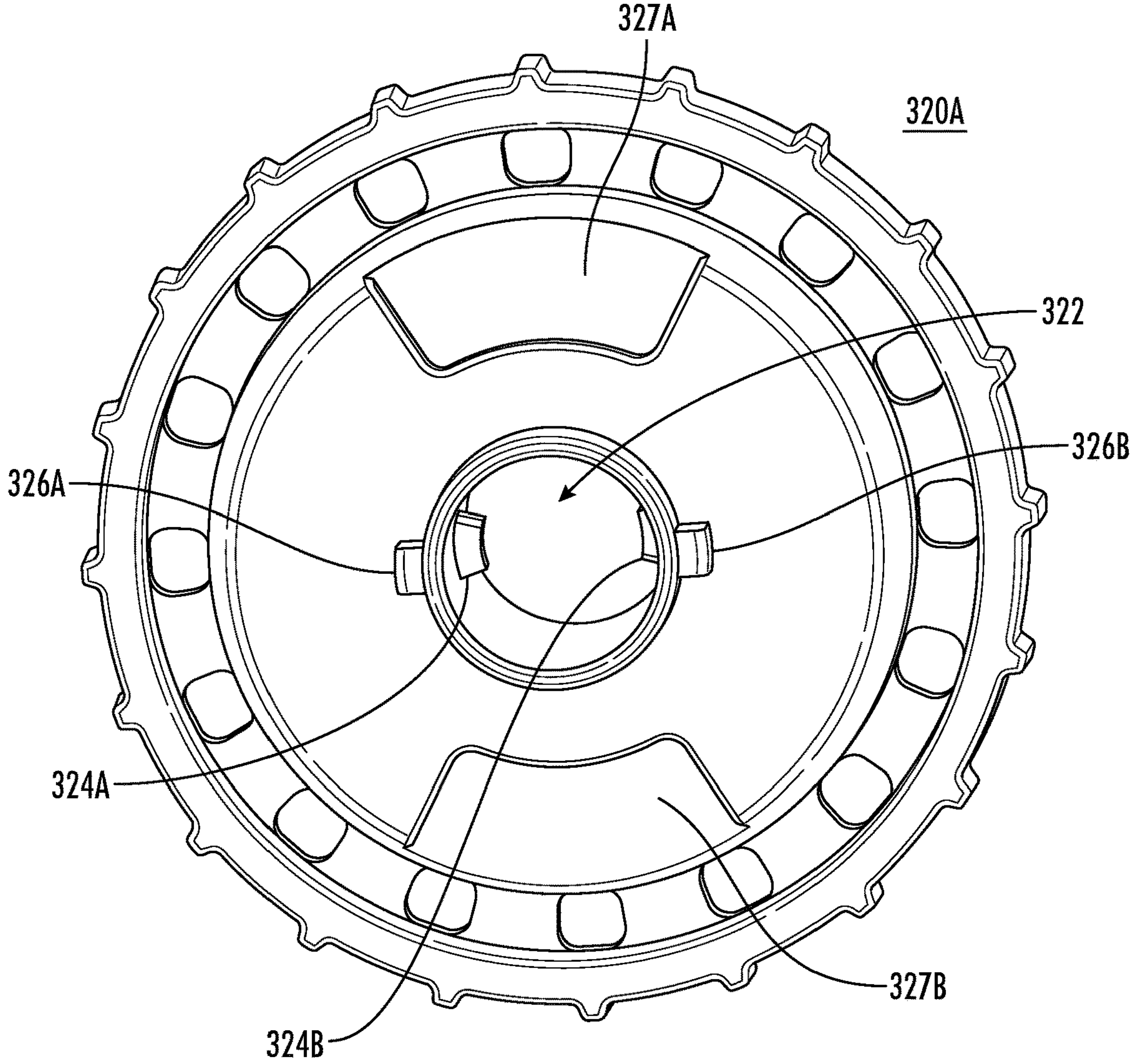
FIG. 5 illustrates a rear view of an exemplary connector in accordance with various embodiments of the present disclosure.

FIG. 5 depicts an exemplary back perspective view of an example connector body in accordance with various embodiments of the present disclosure (e.g., a side of the connector body configured to engage the ribbon). In various embodiments, the connector body 320A may comprise a bore 322 and one or more slots and/or protrusions 324A, 324B (collectively "324") configured to engage with a corresponding one or more protrusions and/or slots on an actuator 300. The bore 322 of the connector body 320A may be configured to receive and/or house the actuator 300 of the friction drive mechanism (e.g., at least a portion of the body portion 312 of the actuator may in some embodiments, be inserted into the bore to facilitate engagement between the inwardly projecting protrusions 324A, 324B on the connector and the outwardly-facing slots 314 on the actuator (e.g., the actuator may have two slots in the depicted embodiment in which the connector has two protrusions). The actuator 300 may be configured to at least partially rotate and/or translate within the bore 322 of the connector body 320A to facilitate relative motion between the protrusions 324A, 324B and slots 314. The rotational movement of the actuator may be either in a clockwise direction and/or counterclockwise direction depending on the configuration of the slot 314. In various embodiments, the rotation and/or translation of the actuator 300 within the connector body 320A may be configured to change the engagement location between a corresponding protrusion 324 of the connector body 320A and a corresponding slot portion of the actuator 300. In various embodiments, the actuator 300 and the connector 320 may be configured to rotate simultaneously together. While in other embodiments, the connector 320 and/or the actuator 300 may be configured to rotate independently from each other.

With further reference to FIG. 5, in various embodiments, the one or more protrusions 324A, 324B and/or slots of the connector body 320A may be disposed on an interior surface of the bore 322. In various embodiments, the one or more protrusion 324 of the connector 320 may be configured to engage with one or more slot portions 314 of an actuator 300 housed within the bore 322 of the connector. A first protrusion 324A of a connector body 320A may be configured to engage with a first slot 314 of the actuator 300. In various embodiments, the engagement of the first protrusion 324A with the first slot portion 314A at a first distal end of the first slot portion may be configured to define the second axial position of the actuator 300. In some embodiments, the first protrusion 324A may be configured to translate axially from the second axial position in an instance in which the user depresses the actuator. In some embodiment, the user may rotate the actuator 300 relative to the connector 320, regardless of which component moves relative to the chassis, in a clockwise direction and/or counterclockwise direction (depending on the orientation of the second slot portion 314B) to move the first protrusion 324A along the second slot portion 314B. The user may then disengage with the actuator 300, wherein the spring may be configured to apply a force to the button head to translate the protrusion into engagement with a wall of the second slot portion (e.g., the notched portion 314C in an instance in which the slot is shaped as shown in FIG. 4A). The engagement of the protrusion 324 and the second slot portion 314B may be configured to define the first axial position of the actuator.

Figure 6:
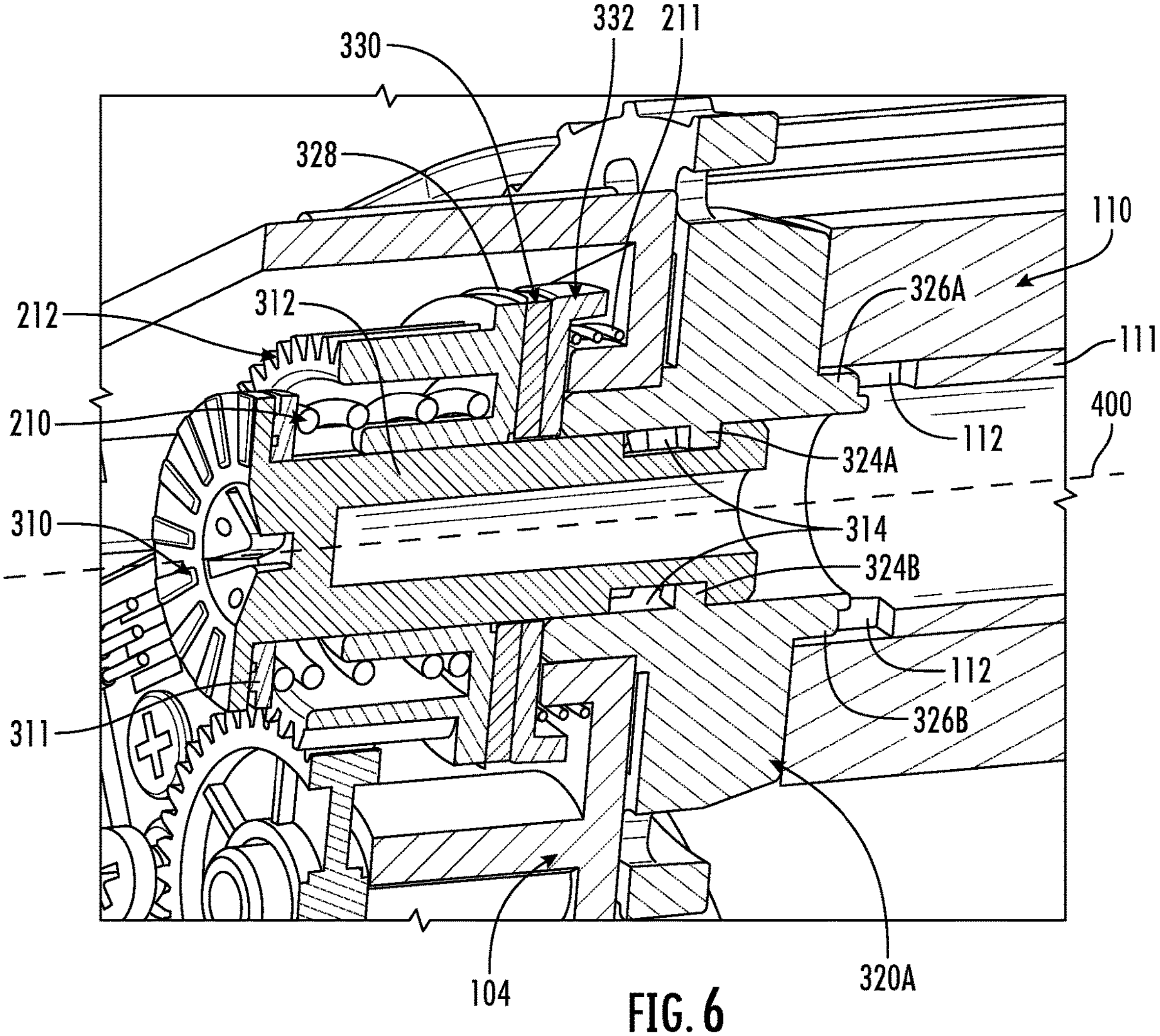
FIG. 6 illustrates a cross-sectional perspective view of an exemplary drive mechanism in an exemplary printer assembly in accordance with various embodiments of the present disclosure.

With reference to FIGS. 3A and 6, a user may depress an actuator 300 which in turn may cause the button head portion 310 of the actuator to compress the spring 210 disposed beneath the bottom surface of the button head 310 of the actuator and a surface of the base of the drive wheel 212. The amount of force the spring 210 directly or indirectly applies to the actuator 300 and/or the drive wheel 212 may be greater when the actuator is disposed in the first axial position (e.g., the position shown in FIGS. 7A-7B). The actuator 300 in the first axial position may be configured to apply a greater amount of compression defining a first compression distance of the spring 210 corresponding to the first axial position. The actuator 300 in the second axial position may be configured to apply a lesser amount of compression to the spring 210 defining a second compression distance (e.g., the position shown in FIGS. 8A-8B). In various embodiments, the greater amount of compression applied to the spring 210 may increase the amount of friction the drive wheel 212 generates between the drive wheel and one or more wear resistant sheets of the connector, which sheets may in some embodiments, form a friction interface with the drive wheel and define the contact surface of the connector 320. In various embodiment, the greater friction force between the drive wheel 212 and the one or more wear resistant sheets may be configured to increase the outputted torque applied to the connector for dispensing the ribbon media.

With continued reference to FIG. 5, in various embodiments, the connector body 320A may further comprise one or more tabs 326A, 326B (collectively "326") configured to engage with a ribbon (e.g., to engage corresponding slots in the ribbon support configured to support at least a portion of the ribbon media). In some embodiments, the connector body 320A may additionally or alternatively include one or more locking recesses 327A, 327B (collectively "327"). The one or more tabs 326 and/or one or more locking recesses 327 may be disposed on a rearward and/or inward/outward surface of the connector 320 (e.g., at least partially facing a corresponding portion of the ribbon 110). In various embodiments, the one or more tabs 326 and/or one or more locking recesses 327 may be disposed linearly opposite of each other relative to the bore 322 and axis of rotation. The ribbon 110 may be configured to rotationally engage with one or more tabs 326 and/or one or more locking recesses 327 of the connector 320, directly or indirectly, to drive the ribbon into rotation, such that a physical abutment may exist between the connector 320 and ribbon. In some embodiments, the abutment may cause a direct mechanical drive between the connector and the ribbon (e.g., instead of a friction drive). In various embodiments, the user may quickly switch ribbons 110 by laterally moving the ribbon away from the connector body 320A and out of the printer assembly 10 while the actuator 300 retains the connector 320 within the printer assembly.

Figure 9:
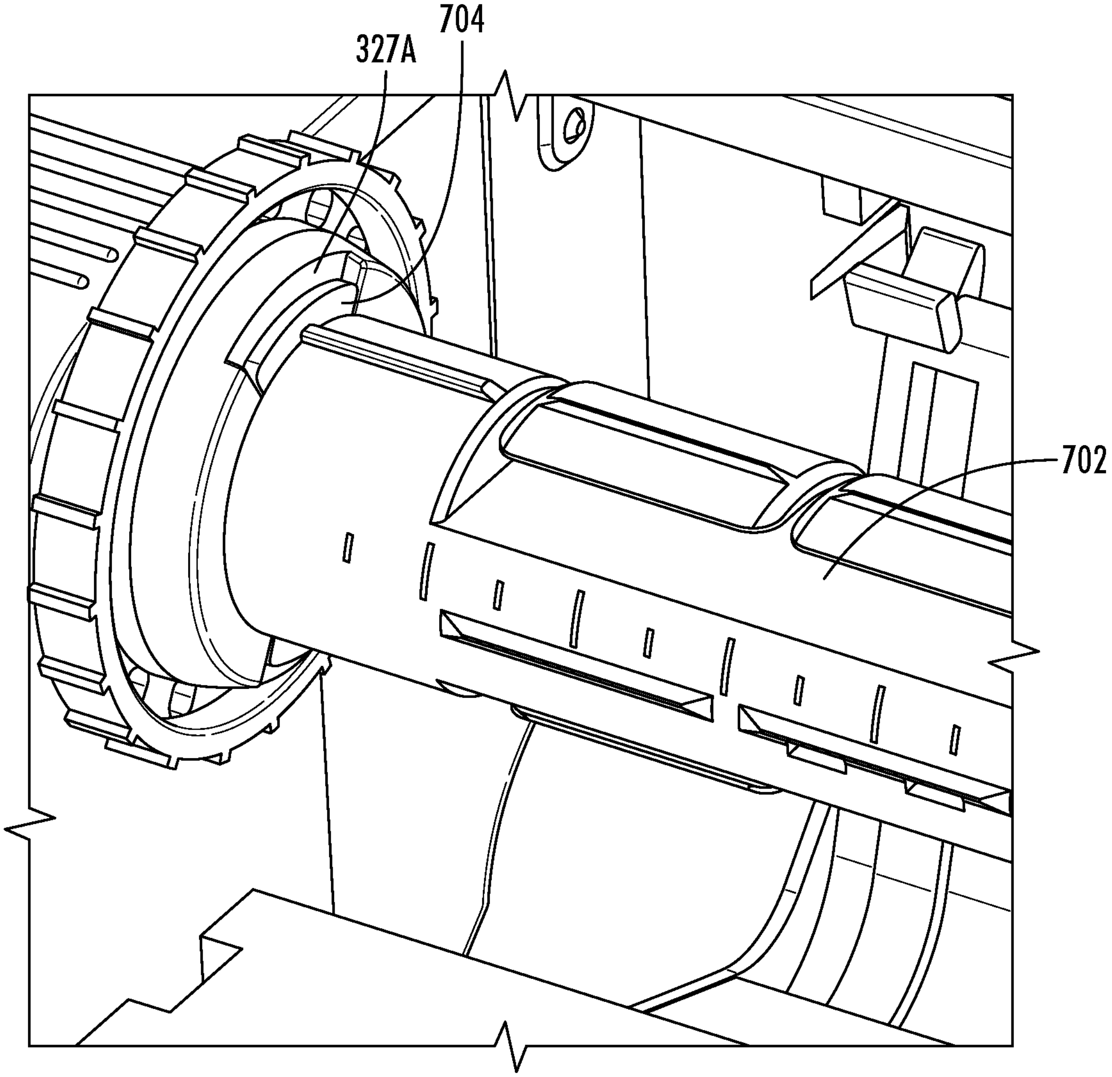
FIG. 9 illustrates a perspective view of an example connector engaging an example spindle in accordance with various embodiments of the present disclosure.

In some embodiments, the one or more tabs 326 and/or one or more locking recesses 327 may be configured to engage the ribbon via corresponding engagement features on the ribbon 110. For example, with reference to FIG. 6, the ribbon 110 may include a ribbon core 111 having slots 112 formed in one or both distal ends thereof. The one or more tabs 326 may be configured to engage the slots 112 to rotate the ribbon and pull the ribbon media onto the ribbon core during operation. With reference to FIG. 9, in some embodiments, the ribbon 110 may include a spindle 702, which may engage the connector body 320A. The spindle 702 may include one or more spindle tabs 704 configured to engage the one or more corresponding recesses 327 of the connector body 320A. While the depicted embodiments show the one or more tabs 326 and/or one or more locking recesses 327 on the connector 320 and the one or more slots 112 and/or one or more spindle tabs 704 on portions of the ribbon assembly, it will be understood in light of the present disclosure that the locations of these features may be interchanged without departing from the scope of the disclosure. In some embodiments, larger ribbons (e.g., one inch ribbons) may use a spindle 702 that engages the ribbon core 111 to support the ribbon and engage the drive mechanism. In some embodiments, smaller ribbons (e.g., half inch ribbons) may operate with the ribbon core 112 in direct engagement with the connector body 320A.

With further reference to FIG. 6, in various embodiments, the connector 320 may comprise two or more parts. For example, the connector may comprise the connector body 320A and at least one wear resistant sheet 328. In some embodiments, the connector may further comprise a holder 332 and/or a rubber gasket 330. For example, in the depicted embodiment, the connector 320 includes a connector body 320A, a holder 332 configured to abut the connector body 320A on an opposite side of the chassis 304 wall. The holder may be a rigid material (e.g., plastic, metal, or the like) providing backing and support to a rubber gasket 330, which may cushion the wear resistant sheet 328. The wear resistant sheet 328 may thereby be configured to contact an inner surface of the drive wheel 212, such that the sheet and the drive wheel form two planar contact surfaces configured to define at least a portion of the friction drive. In some embodiments, a spring 211 may apply a force between the holder 332 and chassis 104.

Figure 7A:
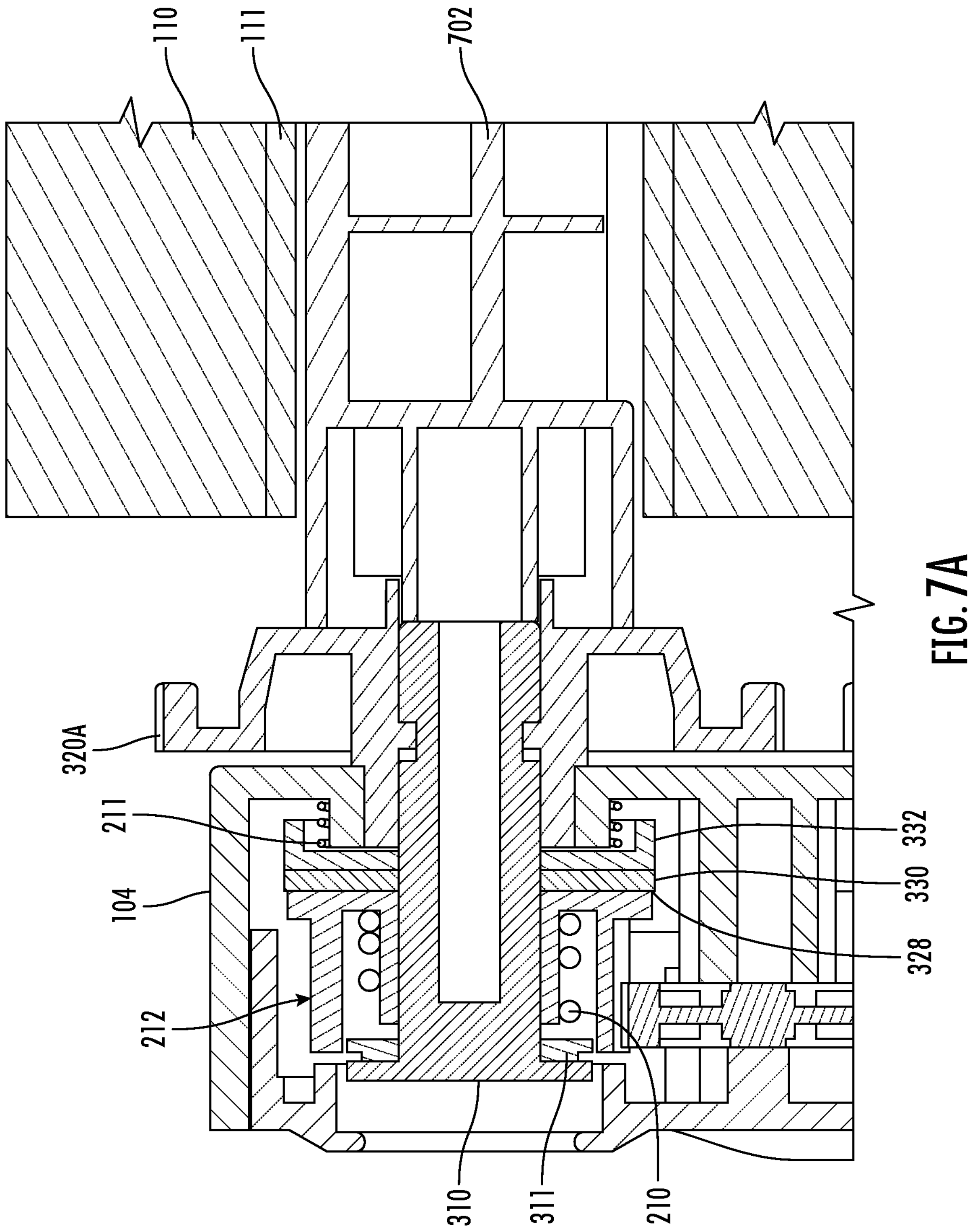
FIG. 7A illustrates a side cross-sectional view of an exemplary drive mechanism in an exemplary printer having an actuator disposed in a first axial position in accordance with various embodiments of the present disclosure.
Figure 7B:
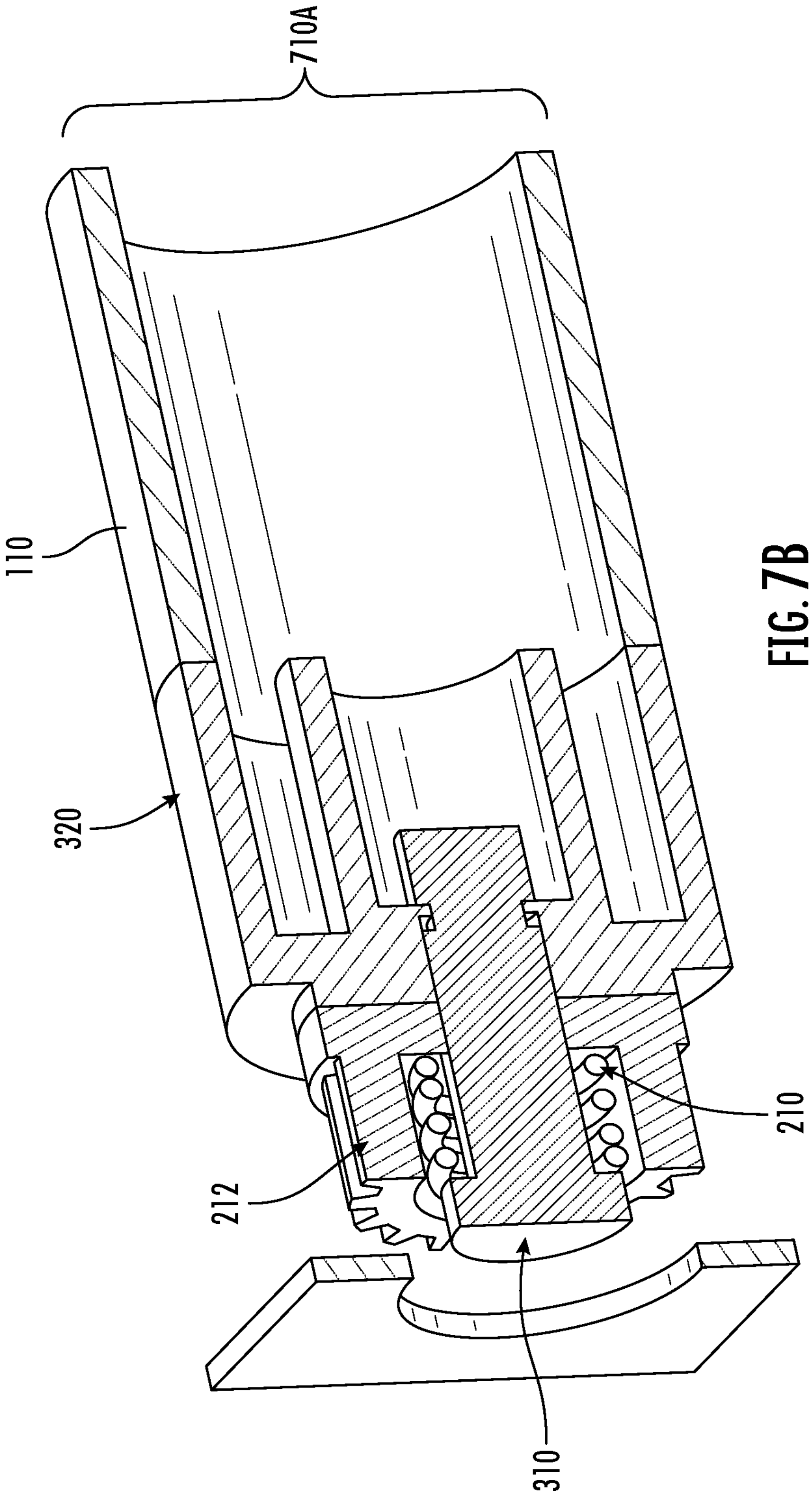
FIG. 7B illustrates a perspective cross-sectional view of an exemplary drive mechanism having an actuator disposed in a first axial position in accordance with various embodiments of the present disclosure.
Figure 8A:
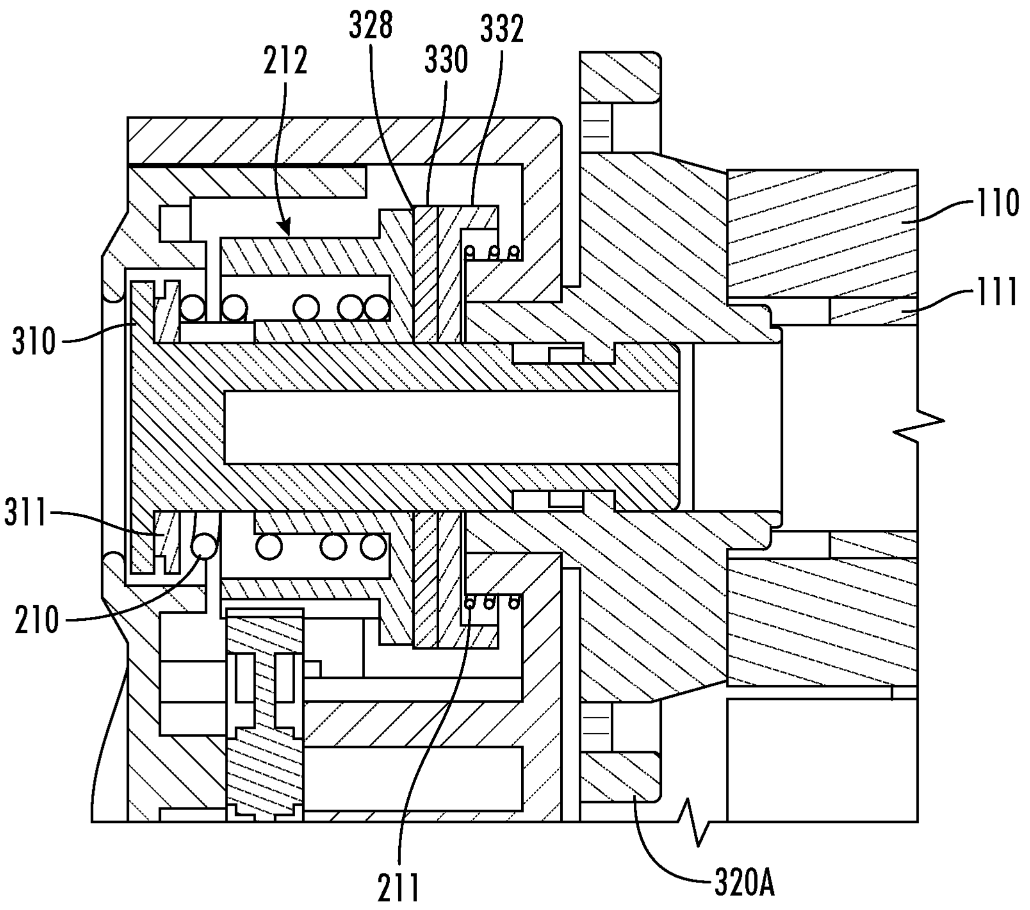
FIG. 8A illustrates a side cross-sectional view of an exemplary drive mechanism in an exemplary printer having an actuator disposed in a second axial position in accordance with various embodiments of the present disclosure.
Figure 8B:
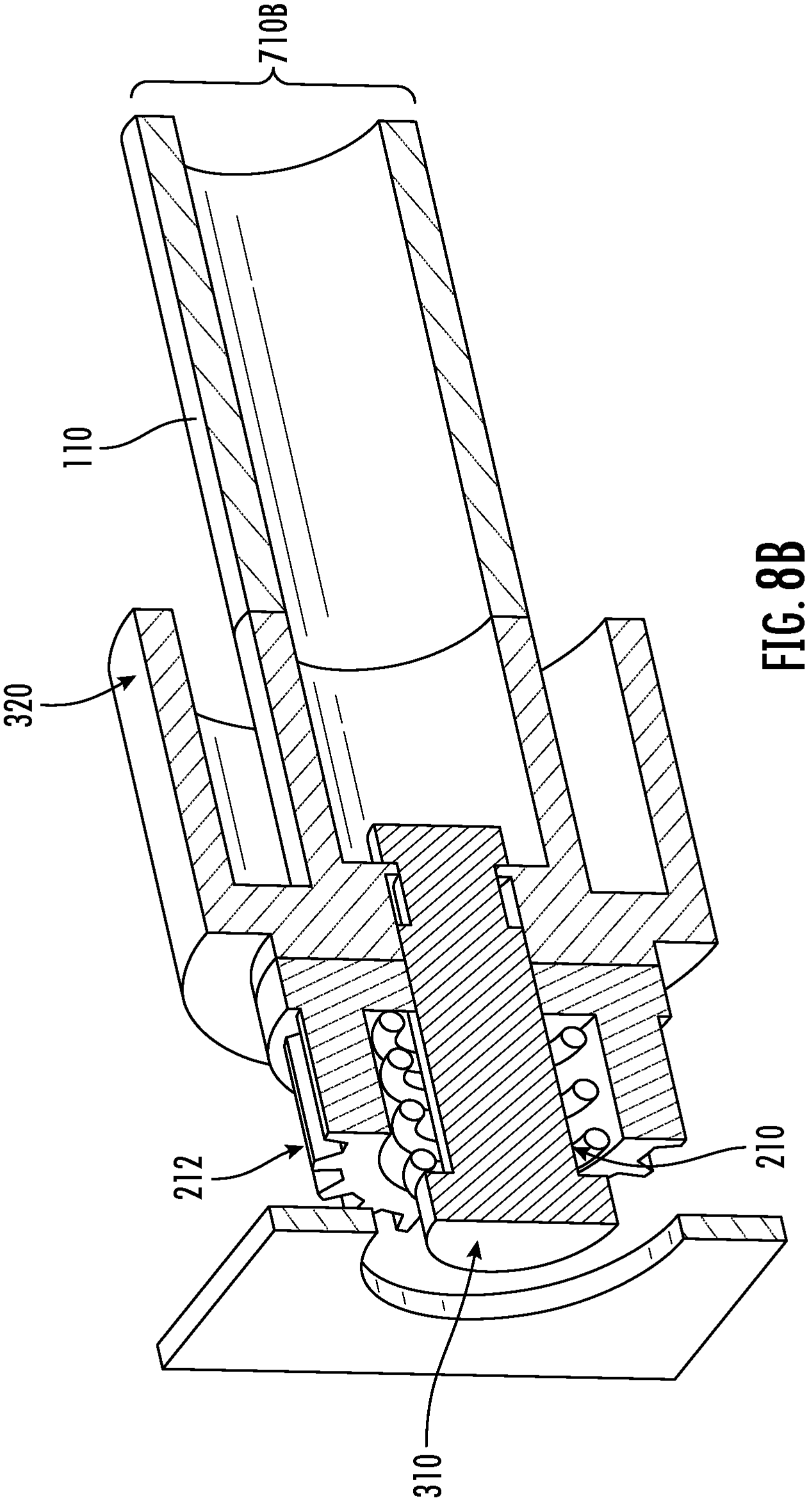
FIG. 8B illustrates a perspective cross-section view of an exemplary drive mechanism having an actuator disposed in a second axial position in accordance with various embodiments of the present disclosure.

FIGS. 6-8B depict exemplary cross-sectional views of friction drive mechanisms within a printer assembly and portions thereof in accordance with various embodiments of the present disclosure. FIGS. 6-7A and 8A depict an example embodiment in which the connector includes a wear resistant sheet 328 that engages an inward-facing surface of the drive wheel to generate the friction that drives the ribbon. FIGS. 7B and 8B depict an example embodiment in which the connector body 320A directly abuts the drive wheel 212 to generate the friction that drives the ribbon. In various embodiments, the connector and drive wheel may comprise any number of intermediate components, and the friction drive mechanism may comprise any two or more surfaces that engage to transfer torque via friction.

With reference to FIGS. 6-7A and 7B, in various embodiments, at least one wear resistant sheets 328 may be configured to directly or indirectly engage with a drive wheel 212 and/or one or more rubber gaskets 330 simultaneously and/or independently. In some embodiments, the wear resistant sheet 328 may comprise a material with a hard surface (e.g., stainless steel, such as stainless steel grade "301") In some embodiments, the connector may further comprise one or more rubber gaskets 330 that may be configured to provide a buffer layer in the axial direction between the one or more wear resistant sheets 328 and the holder 332. The one or more rubber gaskets 330 may be configured to prevent asymmetric or point forces being applied to the one or more wear resistant sheets 328 and the drive wheel 212 to evenly distribute the friction across the surface of the sheet. The one or more rubber gaskets 330 may be further configured to engage the one or more wear resistant sheets 328 opposite of the drive wheel 212 and assist the one or more wear resistant sheets 328 with apply an equal force distribution to the drive wheel 212. At least a portion of the drive wheel, including the contact surface engaging with the at least one wear resistant sheet 328, may comprise a resin material (e.g., polyoxymethylene, etc.). The contact surface of the drive wheel may also include lubrication.

With further reference to FIG. 6, in various embodiments, the connector body 320A may be configured to support the holder 332 while allowing the actuator to pass through an opening within the chassis 104. For example, with the actuator 300 and connector body 320A engaged via the protrusion(s) and slot(s) in either the first axial position or the second axial position, a tension may be applied between the actuator and connector body via the spring 210. The opposing forces generated by the spring 210 may apply compression between the drive wheel 212 and connector body 320A, which forces (e.g., including the normal forces described herein) may transmit through the various intermediate components of the connector (e.g., the wear resistant sheet 328, gasket 330, and/or holder 332) such that the respective intermediate components are held in place by the compression of the spring and the resulting tension between the actuator and connector body.

With further reference to FIG. 6, in various embodiments, a button head 310 may further comprise a wear resistant member 311. In the depicted embodiment, the wear resistant member 311 is disposed opposite of the button head portion 310 that a user may engage. In various embodiments, a spring 210 may be disposed between the wear resistant member 311 of the button head and the drive wheel 212. The spring 210 may be oriented and configured to apply its friction-inducing force along the same axis of rotation 400 of the ribbon, the actuator, and/or the connector body 320A. In some embodiments, the spring 210 may be configured to directly or indirectly apply opposing forces to the wear resistant member 311 of the button head and/or the drive wheel 212 simultaneously. With reference to FIG. 3B, a perspective view of the wear resistant member 311 is shown in engagement with the drive wheel 212. In the depicted embodiment, the wear resistant member 311 includes two prongs 313 and the inner flange 214 of the drive wheel 212 includes two corresponding recesses 215 configured to receive the prongs therein to allow relative translational movement between the wear resistant member and the drive wheel. In the depicted embodiment, the wear resistant member 311 and inner annular surface 216 of the drive wheel may be configured to each abut an end of the spring (e.g., spring 210 shown in FIG. 3A) and allow movement of the actuator and compression of the spring therebetween. While the embodiment of FIG. 3B illustrates two prongs 313 on the wear resistant member 311 and two recesses 215 formed in the drive wheel 212, it will be appreciated in light of the present disclosure that some embodiments of either the wear resistant member or the drive wheel may include any number of prong and recess pairs (or none at all), or other similar alignment mechanisms, configured to facilitate the relative translational movement between the wear resistant member and drive wheel.

The spring 210 may be configured to apply a force on the drive wheel 212 towards the downstream component(s) of the drive mechanism. For example, in the embodiment shown in FIG. 6, the spring 210 is configured to act on an inner annular surface 216 of the drive wheel 210 between an inner flange 214 that surrounds the body portion 312 of the actuator 300 and an outer toothed cylinder of the drive wheel. In various embodiments, the wear resistant sheets 328 may be configured to apply a normal force on the drive wheel 212 towards the upstream component(s) of the drive mechanism, and vice versa, the drive wheel 212 may apply a corresponding opposite force to the wear-resistant sheet. The force applied from the at least one wear resistant sheets 328 may be configured to create a friction force between the drive wheel 212 and the at least one wear resistant sheets 328 when the drive wheel 212 rotates. In operation, the drive wheel 212 and the wear resistant sheet 328 may slip relative to each other, with a difference in the torque output at slipping in the first axial position and the second axial position defining the difference in torque (e.g., a difference in maximum kinetic friction) between the two or more configurations of operation. In some embodiments, a maximum static friction (e.g., the normal force times the coefficient of friction) may define the upper torque limit of the friction drive mechanism in each of the torque output configurations.

With further reference to FIG. 6, in various embodiments, the spring 210 may be compressed a greater distance when the actuator 300 is disposed in a first axial position (e.g., the position shown in FIGS. 7A-7B). The actuator 300 may be configured in a manner, such that, the button head 310 is disposed axially closer to the ribbon 110 when in the first axial position than in the second axial position. The spring 210, in response to the greater amount of compression, may be configured to apply a greater amount of force onto the drive wheel 212 towards the downstream component(s) of the drive mechanism. In various embodiments, the great amount of force applied to the drive wheel 212 may be configured to increase the friction force generated between the contact of the drive wheel 212 with the one or more wear resistant sheets 328. In various embodiments, the greater amount of friction generated between the drive wheel and the one or more wear resistant sheets 328 may output a greater amount of torque transmitted to the ribbon 110. In various embodiments, the greater amount of outputted torque may be better suited for a larger size ribbon (e.g., a one-inch ribbon).

In some embodiments, the spring 210 may be compressed a lesser distance when the actuator 300 is disposed in the second axial position (e.g., the position shown in FIGS. 8A and 8B). The force applied by the spring 210 to the drive wheel 212 may be configured to be less in the second axial position that the force applied in the first axial position. In various embodiments, the friction force generated between the drive wheel 212 and the at least one wear resistant sheets 328 may be configured to be less than the friction force when the actuator 300 is disposed in the first axial position. In various embodiments, the lesser amount of friction generated between the drive wheel and the one or more wear resistant sheets 328 may output a lesser amount of torque transmitted to the ribbon 110. In various embodiments, the lesser amount of outputted torque may be better suited for a smaller size ribbon (e.g., a half-inch ribbon). In some embodiments, the torque at each of the respective axial configurations may be configured to keep the ribbon in sync with the paper or other media output by a rear roller, such that synchronous printing is achieved for each size ribbon.

With reference to FIGS. 7A-7B, example actuators disposed in a first axial position 700 are depicted in accordance with various embodiments of the present disclosure. In various embodiment, as depicted in FIGS. 7A-7B, the button head 310 of the actuator and drive wheel 212 may be configured to compress the spring 210 a first compression distance 720A that is greater than a second compression distance 720B (e.g., shown in FIG. 8B) of the second axial position. The greater amount of compression applied to the spring may cause a larger amount of torque outputted to the connector 320. The larger amount of torque may be better suited for a larger ribbon size 710A. In various embodiments, the actuator 300, the connector 320, and/or the larger ribbon 710A (e.g., a one inch ribbon with or without a spindle 702) may be configured to rotate simultaneously along the same axis of rotation in response to the motor operation and transmission of the rotation to the ribbon via the friction drive mechanism.

With reference to FIGS. 8A-8B, example actuators disposed in a second axial position 800 are depicted in accordance with various embodiments of the present disclosure. In various embodiment, as depicted in FIG. 8B, the actuator 300 may be disposed in the second axial position, wherein the button head 310 may be configured to compress the spring 210 the second compression distance 720B, which is a lesser amount than the first axial position and first compression distance. The lesser amount of compression applied to the spring may cause a lesser maximum amount of torque outputted to the connector 320. The lesser amount of torque may be better suited for a smaller ribbon size 810A. In various embodiments, the actuator 300, the connector 320, and/or the smaller ribbon 810A may be configured to rotate simultaneously along the same axis of rotation in response to the motor operation and transmission of the rotation to the ribbon via the friction drive mechanism. In various embodiments, the motor may also drive one or more other components on the printer assembly, such as roller for delivering paper or other media to the print head in sync with the ribbon media. Various drive components (e.g., one or more intermediate drive components 122 may also be configured to connect the motor and these one or more other components driven by the motor.

With reference to FIG. 9, an embodiment is shown in which the ribbon core engages a spindle 702. The spindle 702 may frictionally engage the ribbon core (e.g., via an outermost diameter of the spindle being interference fit with at least a portion of the ribbon core) and/or may include one or more abutment features (e.g., tabs and slots) to engage and rotate the ribbon media in response to driving force from the drive mechanism. In some embodiments, any size ribbon core may be used with a spindle. In some embodiments, any size ribbon core may be used without a spindle (e.g., with the core directly engaged with the connector 320).

Many modifications and other embodiments of the present disclosure set forth herein will come to mind to one skilled in the art to which this disclosure pertains having the benefit of the teachings presented in the foregoing description and the associated drawings. Therefore, it is to be understood that the present disclosure is not to be limited to specific embodiments disclosed and that modifications and other embodiments are intended to be included within the scope of the appended claims. Moreover, although the foregoing description and the associated drawings describe example embodiments in the context of certain example combination of elements and/or functions, it should be appreciated, in light of the present disclosure, that different combinations of elements and/or functions than those explicitly described above are also contemplated as can be set forth in some of the appended claims. Although specific terms are employed herein, they are used in a generic and descriptive sense only and not for purpose of limitation.

The invention claimed is:

1. A printer ribbon drive mechanism comprising:

a drive wheel configured to receive a torque from a motor and rotate about an axis of rotation;

a connector configured to rotationally drive a printer ribbon, wherein the connector is configured to rotate about the axis of rotation;

a spring configured to compress along the axis of rotation; and an actuator configured to move between a first axial position and a second axial position along the axis of rotation causing the spring to compress and change a torque output from a first a first configuration to a second configuration, wherein the actuator is configured to define a first compression distance of the spring in the first axial position during the first configuration and a second compression distance of the spring in the second axial position during the second configuration, wherein the spring is configured to control a normal force applied directly or indirectly between the connector and the drive wheel along the axis of rotation, and wherein the normal force is greater in an instance in which the actuator is disposed in the first axial position than in an instance in which the actuator is disposed in the second axial position.

2. The printer ribbon drive mechanism of claim 1, wherein the actuator further comprises at least one slot, wherein the connector further comprises at least one protrusion, and wherein the at least one protrusion is configured to be disposed in the at least one slot in a plurality of locations to define the first axial position and the second axial position.

3. The printer ribbon drive mechanism of claim 1, wherein the actuator comprises a button head, wherein the spring is disposed between the button head of the actuator and a surface of the drive wheel, wherein the spring is configured to directly or indirectly apply opposing forces therebetween.

4. The printer ribbon drive mechanism of claim 1, wherein the actuator is configured to rotate between a first rotational position and a second rotational position about the axis of rotation relative to the connector.

5. The printer ribbon drive mechanism of claim 4, wherein the actuator is configured to be disposed in the first rotational position in an instance in which the actuator is in the first axial position and in the second rotational position in an instance in which the actuator is in the second axial position.

6. The printer ribbon drive mechanism of claim 5, the actuator is configured to rotate relative to a printer chassis while moving between the first rotational position and the second rotational position, and the connector is configured to remain rotationally fixed relative to the printer chassis while the actuator moves between the first rotational position and the second rotational position.

7. The printer ribbon drive mechanism of claim 6, the connector is configured to rotate relative to a printer chassis while the actuator transitions between the first rotational position and the second rotational position, and the actuator is configured to remain rotationally fixed relative to the printer chassis while the actuator transitions between the first rotational position and the second rotational position.

8. The printer ribbon drive mechanism of claim 1, wherein the printer ribbon drive mechanism is configured to engage a larger size ribbon in an instance in which the actuator is disposed in the first axial position than in an instance in which the actuator is disposed in the second axial position.

9. The printer ribbon drive mechanism of claim 1, wherein the printer ribbon drive mechanism is configured to apply a larger torque to the ribbon in an instance in which the actuator is disposed in the first axial position than in an instance in which the actuator is disposed in the second axial position.

10. The printer ribbon drive mechanism of claim 1, wherein a speed from the motor remains constant between the first axial position and the second axial position of the actuator, and wherein the normal force and a drive torque imparted directly or indirectly to the connector by the drive wheel varies between the first axial position of the actuator and the second axial position of the actuator.

11. The printer ribbon drive mechanism of claim 1, wherein the connector comprises a connector body and at least one wear resistant sheet configured to engage the drive wheel.

12. A printer assembly comprising:

a motor;

a printer ribbon;

a printer chassis; and a printer ribbon drive mechanism comprising:

a drive wheel configured to receive a torque from the motor and rotate about an axis of rotation;

a connector configured to rotationally drive the printer ribbon, wherein the connector is configured to rotate about the axis of rotation;

a spring configured to compress along the axis of rotation; and an actuator configured to move between a first axial position and a second axial position along the axis of rotation causing the spring to compress and change a torque output from a first configuration to a second configuration, wherein the actuator is configured to define a first compression distance of the spring in the first axial position during the first configuration and a second compression distance of the spring in the second axial position during the second configuration, wherein the spring is configured to control a normal force applied directly or indirectly between the connector and the drive wheel along the axis of rotation, and wherein the normal force is greater in an instance in which the actuator is disposed in the first axial position than in an instance in which the actuator is disposed in the second axial position.

13. The printer assembly of claim 12, wherein the actuator further comprises at least one slot, and the connector further comprises at least one protrusion, wherein the at least one protrusion is configured to be disposed in the at least one slot in a plurality of locations to define the first axial position and the second axial position.

14. The printer assembly of claim 12, wherein the actuator is configured to rotate between a first rotational position and a second rotational position about the axis of rotation relative to the connector.

15. The printer assembly of claim 14, wherein the actuator is configured to be disposed in the first rotational position in an instance in which the actuator is in the first axial position and in the second rotational position in an instance in which the actuator is in the second axial position.

16. The printer assembly of claim 12, wherein the printer ribbon drive mechanism is configured to apply a larger torque to the ribbon in an instance in which the actuator is disposed in the first axial position than in an instance in which the actuator is disposed in the second axial position.

17. The printer assembly of claim 16, wherein a speed from the motor remains constant between the first axial position and the second axial position, while the normal force and a drive torque imparted directly or indirectly to the connector by the drive wheel based on the normal force varies between the first axial position of the actuator and the second axial position of the actuator.

18. The printer assembly of claim 12, wherein the connector comprises a connector body and at least one wear resistant sheet configured to engage the drive wheel.

19. A method of driving a printer ribbon with a printer assembly, wherein the printer assembly comprises:

a motor;

a printer ribbon;

a printer chassis; and a printer ribbon drive mechanism comprising:

a drive wheel configured to receive a torque from the motor and rotate about an axis of rotation;

a connector configured to rotationally drive the printer ribbon, wherein the connector is configured to rotate about the axis of rotation;

a spring configured to compress along the axis of rotation; and an actuator configured to move between a first axial position and a second axial position along the axis of rotation causing the spring to compress and change a torque output from a first configuration to a second configuration, wherein the actuator is configured to define a first compression distance of the spring in the first axial position during the first configuration and a second compression distance of the spring in the second axial position during the second configuration, wherein the spring is configured to control a normal force applied directly or indirectly between the connector and the drive wheel, and wherein the normal force is greater in an instance in which the actuator is disposed in the first axial position than in an instance in which the actuator is disposed in the second axial position;

wherein the method comprises:

operating the motor to apply the torque to the drive wheel, such that the drive wheel is configured to, directly or indirectly, cause the printer ribbon to rotate.

20. The method of claim 19, further comprising:

actuating the actuator from the first axial position to the second axial position, and replacing the printer ribbon with a second printer ribbon having a second diameter less than a first diameter of the printer ribbon.

* * * * *